(12) United States Patent
Fainstain et al.

(10) Patent No.: US 7,425,933 B2
(45) Date of Patent: Sep. 16, 2008

(54) SYSTEMS AND METHODS FOR CORRECTING GREEN DISPARITY IN IMAGER SENSORS

(75) Inventors: Eugene Fainstain, Natanla (IL); Shlomo Polonsky, Modi'in (IL); Miriam Fraenkel, Haifa (IL); Yoav Lavi, Raanana (IL)

(73) Assignee: Samsung Semiconductor Israel R&D Center (SIRC), Ramat Gan (IL)

( * ) Notice: Subject to any disclaimer, the term of this patent is extended or adjusted under 35 U.S.C. 154(b) by 700 days.

(21) Appl. No.: 11/107,387

(22) Filed: Apr. 14, 2005

(65) Prior Publication Data

US 2006/0098868 A1    May 11, 2006

Related U.S. Application Data

(60) Provisional application No. 60/562,630, filed on Apr. 14, 2004.

(51) Int. Cl.
*G09G 3/00* (2006.01)
(52) U.S. Cl. .......................................... 345/32; 345/88
(58) Field of Classification Search ............. 345/30–38, 345/83, 87–100; 257/292, 432; 250/208.1; 359/619; 438/69; 348/340, 360, 479; 396/113
See application file for complete search history.

(56) References Cited

U.S. PATENT DOCUMENTS 6,961,045 B2 * 11/2005 Tsao ........................... 345/103

| 2005/0061950 | A1* | 3/2005 | Jiang et al. | 250/208.1 |
| 2005/0225807 | A1* | 10/2005 | Fainstain et al. | 358/3.26 |
| 2006/0027732 | A1* | 2/2006 | Ahn | 250/208.1 |
| 2006/0038112 | A1* | 2/2006 | Jiang et al. | 250/208.1 |
| 2006/0082885 | A1* | 4/2006 | Glebov et al. | 359/619 |
| 2006/0164533 | A1* | 7/2006 | Hsieh et al. | 348/317 |
| 2006/0249765 | A1* | 11/2006 | Hsieh | 257/292 |

OTHER PUBLICATIONS

Gennadiy Agranov et al., *Crosstalk and Microlens Study in a Color CMOS Image Sensor*, IEEE Transactions on Electron Devices, vol. 50, No. 1, Jan. 2003, pp. 4-11.
*Image Sensors—Anatomy of a Digital Camera: Image Sensors*, http://www.extremetech.com/article2/0,1558,1158540,00.asp, Jun. 12, 2001, 32 pages.

* cited by examiner

*Primary Examiner*—Nitin Patel
(74) *Attorney, Agent, or Firm*—Harness Dickey & Pierce, P.L.C.

(57) ABSTRACT

Embodiments of the present invention relate in general to systems and methods for dynamically correcting color crosstalk and related color distortion in an image sensor. More specifically, but not by way of limitation, certain embodiments of the present invention relate to correcting pixel outputs from a pixel array in an image sensor at the Bayer domain for color cross-talk and/or green disparity using hyperbolically varying correction functions to dynamically derive color cross-talk correction factors using pixel location on the pixel array, a selected pixel output and related outputs from neighboring pixels on the image sensor prior to or synchronous with color interpolation.

22 Claims, 16 Drawing Sheets

FIG. 8C

| | | | | | | | | | | | | | | | | | | | | | |
|---|---|---|---|---|---|---|---|---|---|---|---|---|---|---|---|---|---|---|---|---|---|
| xl | 5 | | | | | | | | | | | | | | | | | | | | |
| yt | 10 | | | | | | | | | | | | | | | | | | | | |
| xc | 40 | | | | | | | | | | | | | | | | | | | | |
| yc | 30 | | | | | | | | | | | | | | | | | | | | |
| St | −39 | | | | | | | | | | | | | | | | | | | | |
| Tl | −140 | | | | | | | | | | | | | | | | | | | | |
| U0 | 825 | | | | | | | | | | | | | | | | | | | | |

| clk | HB | C1 | C2 | C3 | C4 | C5 | C7 | C8 | C9 | C10 | S | T | Incr | adder | Ui | U | 430 | 440 | 470 | 530 | 540 |
|---|---|---|---|---|---|---|---|---|---|---|---|---|---|---|---|---|---|---|---|---|---|
| 1 | 1 | 1 | 0 | 1 | 1 | 2 | 0 | 1 | 1 | 1 | −29 | 777 | −27 | 1029 | 1056 | 1111 | −39 | −140 | −29 | 1056 | 1056 |
| 2 | 1 | 0 | 1 | 0 | 1 | 2 | 0 | 0 | 0 | 1 | −29 | 777 | −27 | 1029 | 1056 | 1111 | −27 | −27 | −29 | 1056 | 1029 |
| 3 | 1 | 0 | 0 | 0 | 1 | 0 | 1 | 0 | 0 | 1 | −29 | −140 | −27 | 1029 | 1056 | 1056 | −27 | −27 | −27 | 1056 | 1029 |
| 4 | 1 | 0 | 0 | 1 | 0 | 4 | 0 | 0 | 1 | 0 | −27 | −140 | −27 | 1029 | 1056 | 1056 | −27 | −27 | −27 | 1056 | 1029 |
| 5 | 0 | 0 | 0 | 0 | 0 | 4 | 0 | 0 | 0 | 0 | −27 | −140 | −136 | 920 | 1029 | 1056 | −136 | −136 | −140 | 1056 | 920 |
| 6 | 0 | 0 | 0 | 0 | 0 | 4 | 0 | 0 | 1 | 0 | −27 | −136 | −132 | 788 | 1029 | 920 | −132 | −132 | −136 | 920 | 788 |
| 7 | 0 | 0 | 0 | 0 | 0 | 4 | 0 | 0 | 0 | 0 | −27 | −136 | −132 | 788 | 1029 | 920 | −132 | −132 | −136 | 920 | 788 |
| 8 | 0 | 0 | 0 | 0 | 0 | 4 | 0 | 0 | 0 | 0 | −27 | −136 | −132 | 788 | 1029 | 920 | −132 | −132 | −136 | 920 | 788 |
| 9 | 0 | 0 | 0 | 1 | 0 | 4 | 0 | 0 | 1 | 0 | −27 | −136 | −128 | 660 | 1029 | 788 | −128 | −128 | −132 | 788 | 660 |
| 10 | 0 | 0 | 0 | 0 | 0 | 4 | 0 | 0 | 0 | 0 | −27 | −132 | −128 | 660 | 1029 | 788 | −128 | −128 | −132 | 788 | 660 |
| 11 | 0 | 0 | 0 | 0 | 0 | 4 | 0 | 0 | 0 | 0 | −27 | −132 | −128 | 660 | 1029 | 788 | −128 | −128 | −132 | 788 | 660 |
| 12 | 0 | 0 | 0 | 1 | 0 | 4 | 0 | 0 | 1 | 0 | −27 | −132 | −128 | 660 | 1029 | 788 | −128 | −128 | −132 | 788 | 660 |
| 13 | 0 | 0 | 0 | 0 | 0 | 4 | 0 | 0 | 0 | 0 | −27 | −132 | −128 | 660 | 1029 | 788 | −128 | −128 | −132 | 788 | 660 |
| 14 | 0 | 0 | 0 | 0 | 0 | 4 | 0 | 0 | 0 | 0 | −27 | −128 | −124 | 536 | 1029 | 660 | −124 | −124 | −128 | 660 | 536 |

US 7,425,933 B2

SYSTEMS AND METHODS FOR CORRECTING GREEN DISPARITY IN IMAGER SENSORS

CROSS-REFERENCES TO RELATED APPLICATIONS

This application claims priority from U.S. Provisional Patent Application Ser. No. 60/562,630, filed Apr. 14, 2004, entitled, GREEN DISPARITY CORRECTION FOR CMOS IMAGERS-METHODS AND CIRCUITS, the complete disclosure of which is incorporated herein by reference for all purposes.

BACKGROUND OF THE INVENTION

This disclosure relates in general to systems and methods for dynamically correcting color cross-talk and/or green disparity in an image sensor. More specifically, but not by way of limitation, this disclosure relates to correcting pixel outputs from a pixel array in an image sensor at a Bayer domain for color cross-talk and/or green disparity using hyperbolically varying correction functions to dynamically derive color correction factors using pixel location on the pixel array, selected pixel outputs and outputs from pixels neighboring the selected pixels prior to or synchronous with color interpolation.

In many image sensors, pixels in the image sensor array are associated with a color filter in a color filter array that provides that each of the pixels in the pixel array only receives light with certain wavelength properties. In many image sensors, the color filter array may comprise a combination of red, blue and/or green filters. The configuration of the color filter array and the pixel array in the image sensor may give rise to a color cross-talk phenomenon in the image sensor in which light going through one type of color filter in the filter array may be incident upon the active light sensitive area of a pixel neighboring the pixel associated with the color filter. In the event that the neighboring pixel is associated with a different color filter, the color cross-talk may cause color distortion of an image produced by the image sensor.

To mitigate the effects of color cross-talk some image sensor manufacturers have attempted to position the color filter array in the image sensor as close as possible to the active light sensitive areas of the pixels in the pixel ray or else to mitigate the problem by other optical or mechanical means. Layout of pixels on the pixel array, barriers between pixels on the pixel array, optical configuration of lenses associated with the image sensor, color disparity correction after color interpolation of the raw pixel outputs and/or the like may be useful methods in reducing cross-talk and associated color disparity for an image sensor. However, such methods may increase image sensor cost, may result in increased power consumption by the image sensor, may be difficult to fabricate, may cause other unwanted optical effects and/or may not provide for accurate and/or dynamic correction of the color cross-talk and/or color distortion. As such, there is a need in the art for methods and/or systems for correcting color cross-talk and/or color distortion in image sensors that may be applied dynamically to unprocessed "raw" pixel outputs, prior to or concurrently with color interpolation.

BRIEF DESCRIPTION OF THE DRAWINGS

The present disclosure is described in conjunction with the appended figures:

FIG. 8C is a table providing numerical values of control signals, values of S and T and values of the components of the circuit illustrated in FIG. 8A for different pixel clock values as a pixel array is scanned in accordance with an embodiment of the current invention;

Figure 1A:
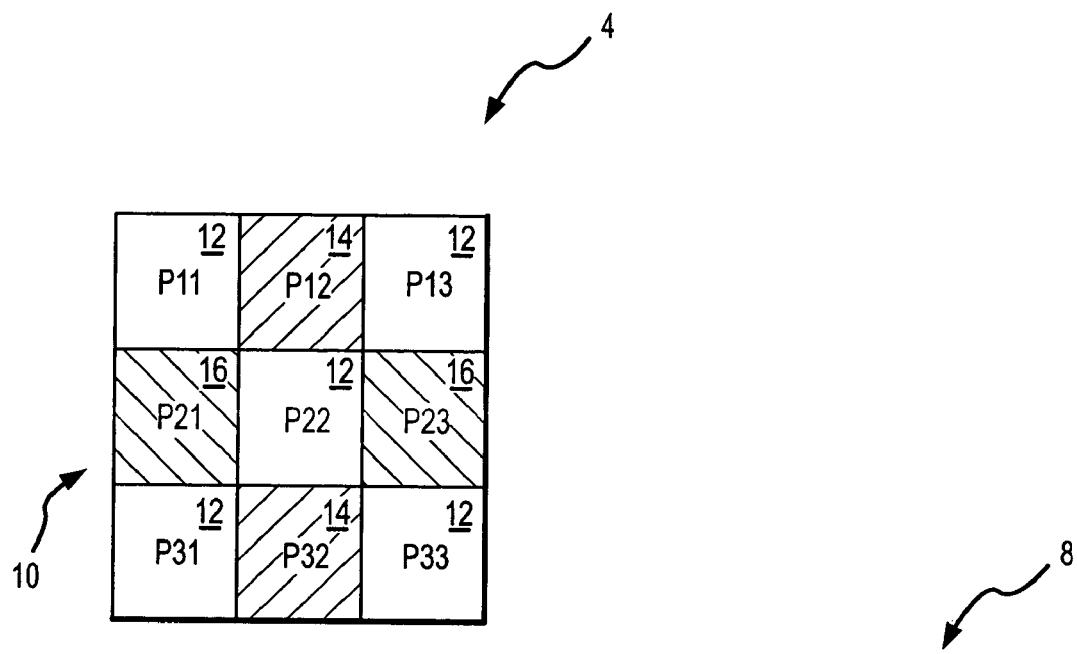
FIG. 1A illustrates neighboring pixel data for a green filter on a red line in a Bayer pattern.

In the appended figures, similar components and/or features may have the same reference label.

DETAILED DESCRIPTION OF THE INVENTION

Embodiments of the present invention relate in general to systems and methods for dynamically correcting color cross-talk and related color distortion in an image sensor. More specifically, but not by way of limitation, certain embodiments of the present invention relate to correcting pixel outputs from a pixel array in an image sensor at the Bayer domain for color cross-talk and/or green disparity using hyperbolically varying correction functions to dynamically derive color correction factors using pixel locations on the pixel array, selected pixel outputs and related outputs from neighboring pixels in the image sensor prior to or synchronous with color interpolation. Certain embodiments of the current invention may provide inexpensive and/or accurate methods and systems for dynamically correcting color cross-talk and or green disparity in an image sensor electronically. In other embodiments, image processing systems and methods may be used to provide for correction of color cross-talk incurred by the red and blue pixels on the image sensor.

The ensuing description provides preferred exemplary embodiment(s) only and is not intended to limit the scope, applicability or configuration of the invention. Rather, the ensuing description of the preferred exemplary embodiment(s) will provide those skilled in the art with an enabling description for implementing a preferred exemplary embodiment of the invention. It being understood that various changes may be made in the function and arrangement of elements without departing from the spirit and scope of the invention as set forth in the appended claims.

Specific details are given in the following description to provide a thorough understanding of the embodiments. However, it will be understood by one of ordinary skill in the art that the embodiments may be practiced without these specific details. For example, circuits may be shown in block diagrams in order not to obscure the embodiments in unnecessary detail. In other instances, well-known circuits, processes, algorithms, structures, and techniques may be shown without unnecessary detail in order to avoid obscuring the embodiments.

Also, it is noted that the embodiments may be described as a process which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed, but the process could have additional steps not included in the figure. A process may correspond to a method, a function, a procedure, a subroutine, a subprogram, etc. When a process corresponds to a function, its termination corresponds to a return of the function to the calling function or the main function.

Moreover, as disclosed herein, the term "storage medium" may represent one or more devices for storing data, including read only memory (ROM), random access memory (RAM), magnetic RAM, core memory, magnetic disk storage mediums, optical storage mediums, flash memory devices and/or other machine readable mediums for storing information. The term "computer-readable medium" includes, but is not limited to portable or fixed storage devices, optical storage devices, wireless channels and various other mediums capable of storing, containing or carrying instruction(s) and/or data.

Furthermore, embodiments may be implemented by hardware, software, firmware, middleware, microcode, hardware description languages, or any combination thereof. When implemented in software, firmware, middleware or microcode, the program code or code segments to perform the necessary tasks may be stored in a machine readable medium such as a storage medium. A processor(s) may perform the necessary tasks. A code segment may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, etc.

While embodiments of the present invention may be used to correct for cross-talk related color distortion associated with any color in an image sensor, certain embodiments are disclosed that may be used to correct green disparity in an image sensor using a Bayer pattern arrangement of colored filters. While much of the discussion below specifically discusses systems and methods that are suitable for use for correcting color cross-talk, the same systems and methods may be used to correct for color distortion, which is an effect of color-cross-talk. As such, the terms color cross-talk, color distortion and green distortion may often be used interchangeably in the specification.

In image sensors employing Bayer pattern filter arrays and the like, there may be some disparity between output from pixels associated with green filters in a red/green line of pixels (a red line) on the pixel array, wherein the pixels on the line are associated alternately with red and green filters in the color filter array, and pixels associated with green filters in a blue/green line of pixels (a blue line) on the pixel array, wherein the pixels on the line are associated alternately with blue and green filters in the color filter array. Several mechanisms may cause this disparity. A major factor in the disparity is dependant on the angle at which light from an object to be imaged is incident upon the pixels on the pixel array. This angle may be a function of the horizontal and vertical distances of pixels from the array center and/or the optical characteristics of the image sensor.

By reviewing and/or studying image sensors and pixel outputs under various lighting conditions and different optical alignments, Applicants determined that the color cross-talk across the image sensor may vary with the x and y locations of pixels across the sensor. Color cross-talk between pixels may be a minimum at a center of the pixel array and a maximum at an edge of the image sensor. Further, color cross-talk may vary hyperbolically so that similar pixels located on the same hyperbole on the image sensor may experience similar color cross-talk effects. As such, color cross-talk may be modeled by a function of a hyperbolic-type equation, such as $(X-A)^2-(Y-B)^2=R^2$.

More precise observation provided that the amount of light energy incident on a selected pixel after having passed through the filters of vertically neighboring pixels—that is, the pixels above and below the green pixel—is proportional to the amount of light incident on those neighboring pixels and the hyperbolic location of the selected pixel on the pixel array relative to a center of the pixel array. The hyperbolic location of the selected pixel may be calculated in Cartesian coordinates from a center of the pixel array, where the center of the pixel array may be a physical or an optical center. In certain aspects, the color cross-talk associated with the vertically neighboring pixels may be calculated from a function of the amount of light incident on the vertically neighboring pixels multiplied by the sum of a first constant and the product of a second constant and the difference of the squares of the X and Y distances of the selected pixel from the center of the pixel array.

Similarly, the amount of light energy incident on a selected pixel after having passed through the filters of horizontally neighboring pixels—that is, pixels to the right the left of the selected pixel on the pixel array—is proportional to the amount of light incident on those neighboring pixels and the hyperbolic location of the selected pixel on the pixel array relative to a center of the pixel array. In certain aspects, the color cross-talk associated with the horizontally neighboring pixels may be calculated from a function of the amount of light incident on the horizontally neighboring pixels multiplied by the sum of a first constant and the product of a second constant and the difference of the squares of the X and Y distances of the green pixel from the center of the pixel array.

As discussed above, in an image sensor using a Bayer pattern of color filters in a filter array associated with the image sensor's pixel array there are two types of pixel lines—"red lines" comprising red and green pixels—and "blue lines" comprising blue and green pixels. As such, for green pixels, the constants associated with the functions discussed above, may be different depending upon the type of line the green filter, for which the color cross-talk is being calculated, is situated on.

In mathematical terms, the color cross-talk for a green pixel in a red line in a Bayer pattern may be described as:

$$G1'=G1+(P12+P32)*[C1+C2*(X0^2-Y0^2)]+(P21+P23)*[C3+C4*(X0^2-Y0^2)] \qquad (1)$$

Where G1 is the desired output from the green pixel on the red line without the cross talk effects, G1' is the actual green pixel output with the results of the color cross-talk, P12, P32, P21 and P23 represent the light incident on the vertically and horizontally neighboring pixels of the green pixel and X0 and Y0 represent the Cartesian location of the green pixel on the pixel array. Constants C1, C2, C3 and C4 are the constants related to the calculation of cross-talk for a green pixel on a red line. In the equation the values P12, P32, P21 and P23 may be derived from the outputs from the four pixels horizontally and vertically appurtenant to the green pixel. Further, the constants C1, C2, C3 and C4 may be determined for groups of image sensors with the same configuration, etc., through logical calculation or simulation, or through measurement of some kinds of devices actually made as models.

In mathematical terms, the color cross-talk for a green pixel in a blue line in the Bayer pattern may be described as:

$$G1'=G1+(P12+P32)*[C5+C6*(X0^2-Y0^2)]+(P21+P23)*[C7+C8*(X0^2-Y0^2)] \qquad (2)$$

Where G1 is the desired output from the green pixel on the red line without the cross talk effects, G1' is the actual green pixel output including the results of the color cross-talk, P12, P32, P21 and P23 represent the light incident on the vertically and horizontally neighboring pixels of the green pixel and X0 and Y0 represent the Cartesian location of the green pixel on the pixel array. Constants C5, C6, C7 and C8 are the constants related to the calculation of cross-talk for a green pixel on a blue line. The constants C5, C6, C7 and C8 may be determined for types of image sensors with the same optical and/or array configuration, etc., through logical calculation or simulation, or through measurement of some kinds of devices actually made as models. The difference between the first set of constants C1, C2, C3 and C4 and the second set of constants C5, C6, C7 and C8 is what may cause color disparity between green pixels on red lines and green pixels on blue lines. As persons of skill in the art may appreciate equations (1) and (2) may be used to describe color cross-talk for pixels of different colors on the pixel array, such as red and blue pixels.

FIG. 1A illustrates neighboring pixel data for a green filter on a red line in a Bayer pattern. Pixel pattern 4 illustrates location of colored pixels—green pixels 12, red pixels 16 and blue pixels 14—for processing of cross-talk for a green pixel P22 on a red line 10. As may be seen from the pattern layout, the green pixel P22 is bounded horizontally by two red pixels—P21 and P23—on the red line 10. As also may be seen from the pattern layout, the green pixel P22 is bounded vertically by two blue pixels—P12 and P32.

Figure 1B:
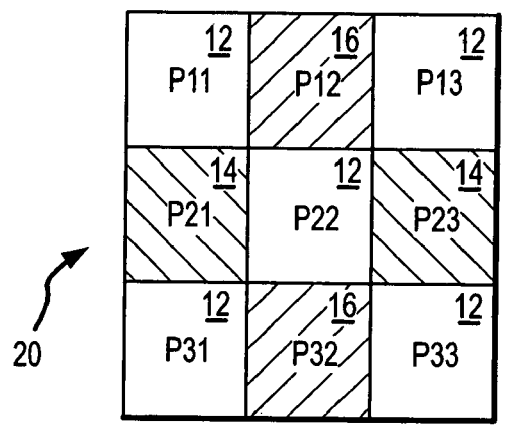
FIG. 1B illustrates neighboring pixel data for a green filter on a blue line in a Bayer pattern.

FIG. 1B illustrates neighboring pixel data for a green filter on a blue line in a Bayer pattern. Pixel pattern 8 illustrates location of colored pixels, green pixels 12, blue pixels 14 and red pixels 16 for processing of cross-talk for a green pixel P22 on a blue line 20. As may be seen from the pattern layout, the green pixel P22 is bounded horizontally by two blue pixels—P21 and P23—on the blue line 20. As may be seen from the pattern layout, the green pixel P22 is bounded vertically by two red pixels—P12 and P32.

In equation (1) and equation (2), above, X0 and Y0 are the horizontal and vertical distances of the pixel from the center of the pixel array, where the center of the array may be a physical center, an optical center or the like. As such, X0=X−Xc and Y0=Y−Yc, where Xc and Yc are the coordinates of the center of the array. In some embodiments of the present invention, the center of the pixel array may be defined as the point directly underneath the center of the lens associated with image sensor. In some other embodiments, the center of the pixel array may be defined as the physical center of the pixel array.

Equation (1) and Equation (2) may be combined and rearranged to form an Equation 3 mathematically describing the color cross talk for green pixels on either a blue or a red line:

$$Gr,b'=Gr,b+Vm*(C1r,b+C2r,b*((X-Xc)^2-(Y-Yc)^2))+Hm*(C3r,b+C4r,b*((X-Xc)^2-(Y-Yc)^2)) \qquad (3)$$

Where Vm, Hm are the averages of the outputs of the vertically and horizontally neighboring pixels to the green filter at issue, respectively.

The double subscript r,b denotes a two element vector, the first element in the vector may be used for calculation of color cross-talk for green pixels on red lines and the second element of the vector may be used for the calculation of color cross talk for green pixels on blue lines.

In some embodiments of the present invention, digital correction for the green pixels in a Bayer pattern in an image sensor may be provided for by obtaining a raw output or a noninterpolated output from green pixel and providing image processing to the output in accordance with either Equation (1), Equation (2) or Equation (3), depending upon the type of line the green pixel is located on. Since color cross-talk may also cause color distortion of blue and red pixels, the methods and systems described in this specification may also be useful for the correction of color cross-talk for blue and/or red pixels. Further, color cross-talk may also occur in image sensors that do not employ the Bayer pattern and the systems and methods described in this specification may also be used to correct color cross-talk in such image sensors.

The ensuing description provides preferred exemplary embodiment(s) only, and is not intended to limit the scope, applicability or configuration of the invention. Rather, the ensuing description of the preferred exemplary embodiment(s) will provide those skilled in the art with an enabling description for implementing a preferred exemplary embodiment of the invention. It being understood that various changes may be made in the function and arrangement of elements without departing from the spirit and scope of the invention as set forth in the appended claims.

Figure 2A:
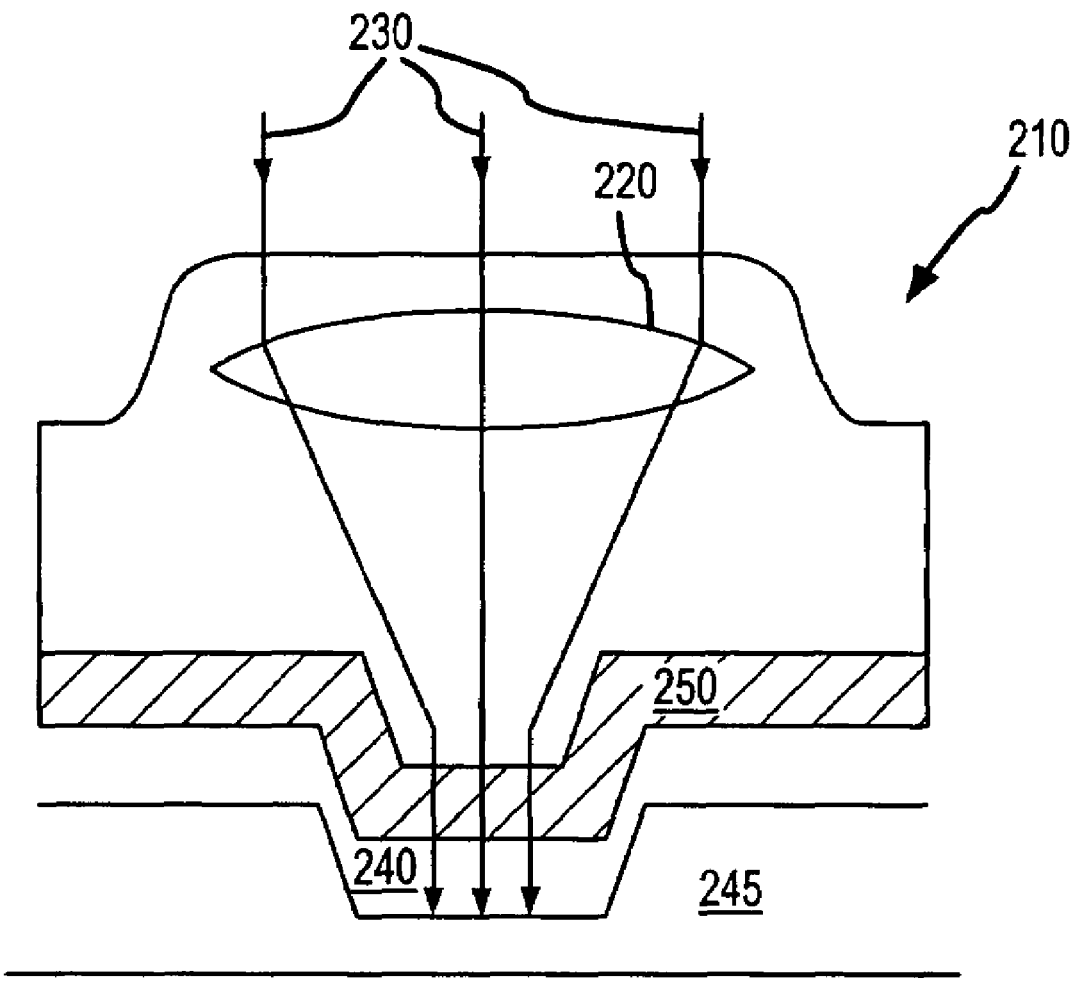
FIG. 2A illustrates basic features of a pixel in an image sensor.

FIG. 2A illustrates basic features of a pixel in an image sensor. Pixel 210 includes a microlens 220 that focuses the photons 230 incident upon the pixel 210 onto the photodiode 240. The photodiode is fabricated into a silicon substrate 245. To reach the photodiode the photons 230 must pass through a color filter 250. In general, each pixel in a pixel array is associated with either a green, blue or red filter.

Figure 2B:
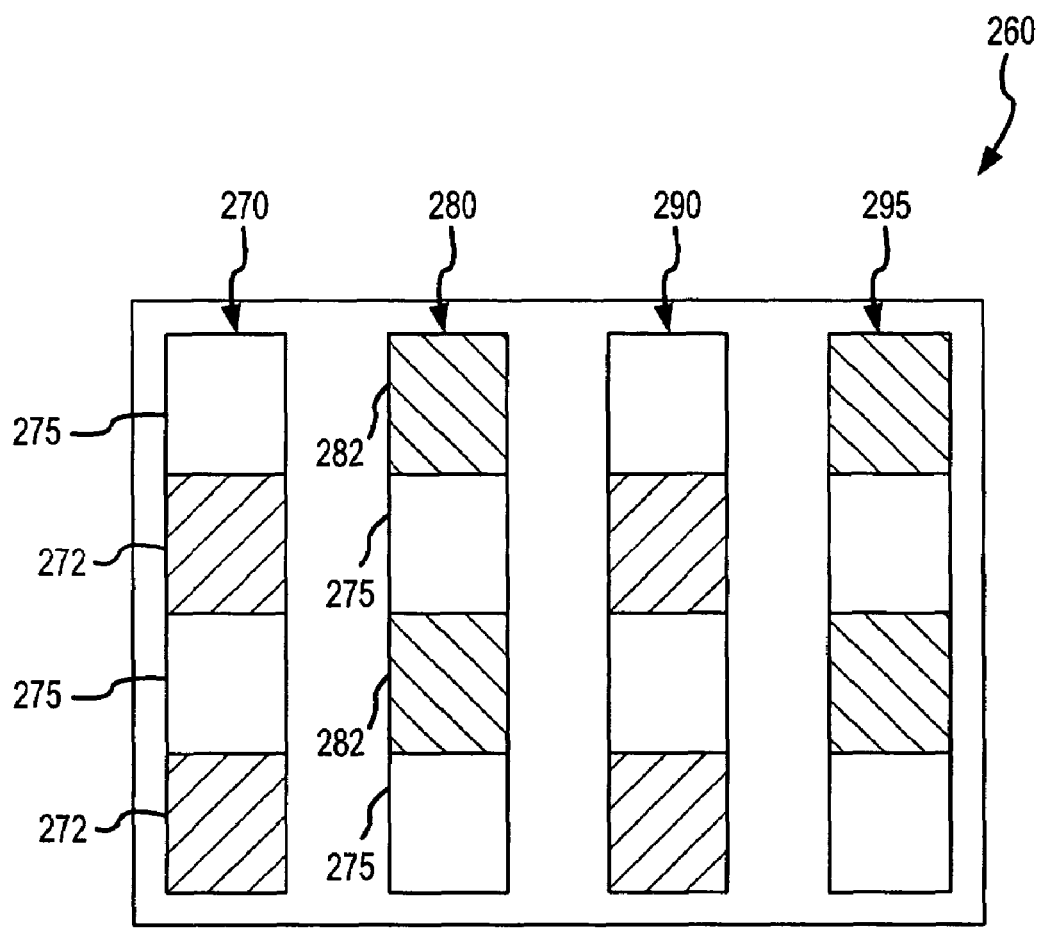
FIG. 2B illustrates distribution of color filters across a pixel array in an image sensor.

FIG. 2B illustrates distribution of color filters across a pixel array in an image sensor. In an image sensor the color filters associated with each pixel on a pixel array 260 may be arranged in a mosaic pattern. In the pixel array 260 illustrated in FIG. 2B the mosaic pattern of colored filters comprises four lines of color filters, lines 270, 280, 290 and 295. In the first line of color filters 270, red filters 272 alternate with green filters 275. In the second line of color filters, line 280 green filters 275 are alternated with blue filters 282. The resulting mosaic pattern of filters is called a Bayer pattern and includes twice as many green filtered pixels as red or blue filtered pixels because the human eye is more sensitive to green. Many other types of color filter patters exist, such as CYGM using cyan, yellow, green, and magenta filters in equal numbers and the these filter patterns may also be corrected for color cross-talk using embodiments of the present invention.

Figure 3:
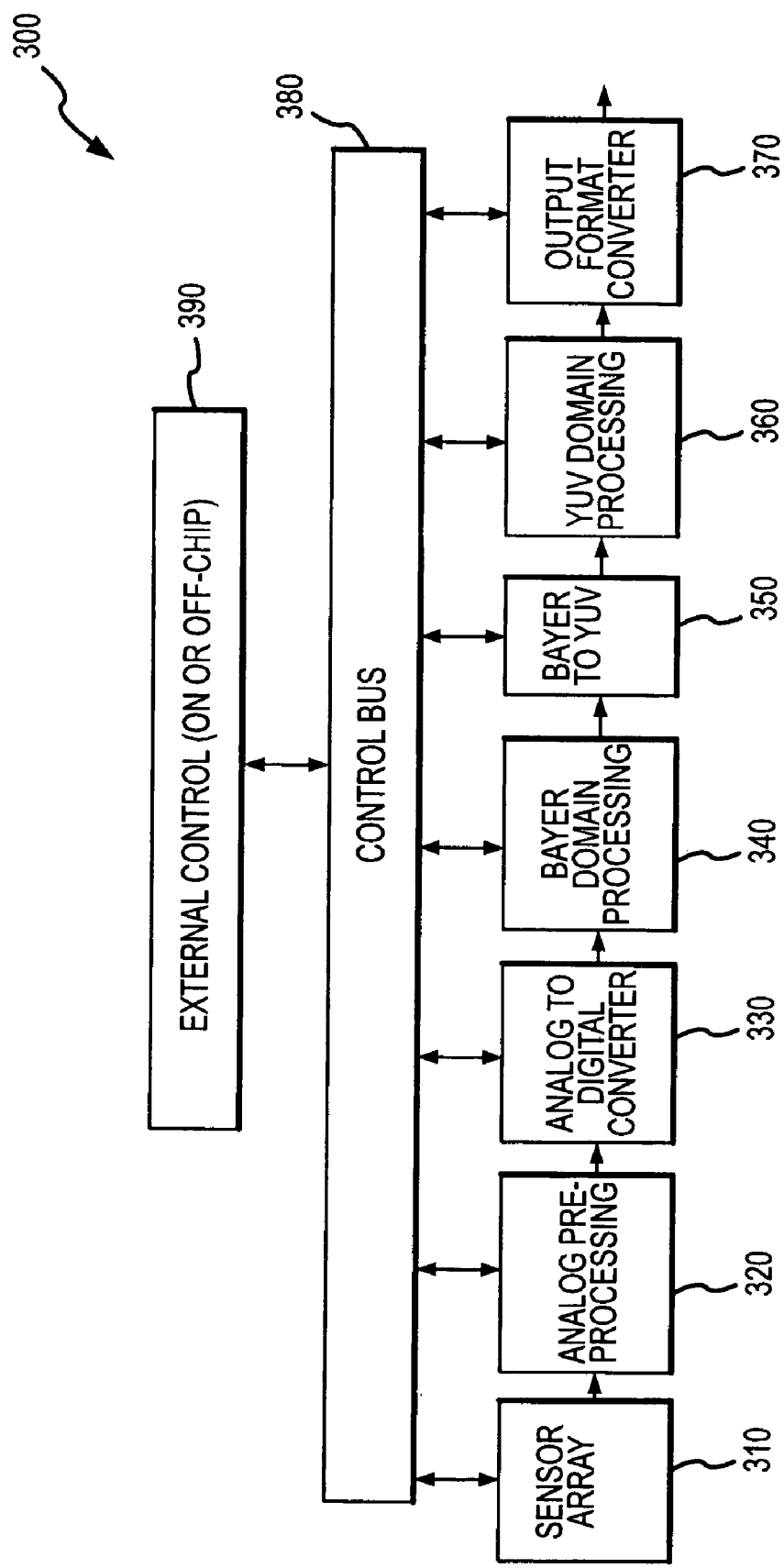
FIG. 3 is a block diagram depicting image processing including color cross-talk and/or green disparity processing in a CMOS image sensor in accordance with an embodiment of the present invention.

FIG. 3 is a block diagram depicting image processing including color cross-talk and/or green disparity processing in a CMOS image sensor in accordance with an embodiment of the present invention. In a CMOS image sensor 300, a sensor array 310 comprising a plurality of pixels converts an image that is incident upon the CMOS image sensor 300 into a plurality of analog voltages, where each pixel on the sensor array 310 outputs an analog voltage in response to the light incident on the pixel from the image. An analog pre-processor 320, among other analog processing functions, may correct the offset and gain variations for each of the pixel outputs. The pre-processed analog outputs may then be converted by an analog to digital converter 330 to a digital form. As such, after analog to digital conversion, a digital representation of the image incident upon the CMOS image sensor 300 may be produced. This digital representation of the image is in the Bayer domain since it is in raw color data form and has not been processed to include missing color components. While the term Bayer domain is used to describe the raw color format of the digital image, the current invention may be used with image sensors using color patterns other than Bayer patterns, such as color patterns using yellow color filters, magenta color filters, and/or the like.

In Bayer domain processing 340, embodiments of the current invention may be used to digitally correct for color cross-talk and or green disparity. Further, in the Bayer domain processing step 340 correction of shading effects may also be performed. Advantageously, at this point in the image processing method, the digitally converted outputs from the pixels have not been demosaiced. Furthermore, outputs from pixels neighboring a pixel for which an output is being processed and corrected may be identified/stored fairly easily at this level and then used in the dynamic correction process.

In the Bayer to YUV conversion process 350, as an initial step, the digital outputs from the pixels in the sensor array 310 may be used along with the understanding of the color pattern of the color filters used with the sensor array 310, which patterns may vary between the different image sensors, to reconstruct and/or interpolate the missing color components for each pixel. Because each of the pixels on the sensor array 310 is associated with a color filter only a proportion of the red, green and blue light falling on the sensor array 310 is captured. Using demosaicing algorithms, in a process called demosaicing, the missing color components may be determined from the outputs of neighboring pixels on the sensor array 310 and an accurate color image from the sensor array 310 may be obtained. However, after demosaicing has occurred, the actual outputs from the pixels of the sensor array 310 are modified and accurate color cross-talk and or green disparity correction is more complicated and is likely to be less accurate.

After the initial processing, in step 350, a Bayer to YUV converter may translate the image from the Bayer domain, which may be specific to the image sensor array, to a universal video standard. In the illustrated example the universal video standard is defined as YUV video standard, however, the conversion may be to another standard video signal. Further image processing may be done in the YUV domain 360, including but not limited to sharpening, white balance, filtering and similar functions.

In a final step, the processed YUV image may be converted to the desired output format by output format converter 370. Each of the components in the CMOS image processor 300 may be controlled by a control bus 380 that may program the processing parameters of the various units and govern the timing of the selection and processing of the inputs and outputs of the components. For example, the control bus 380 may control the scanning of outputs from the pixels on the sensor array that may in turn be processed to form the output image from the CMOS image processor 300. Control bus 380 may comprise one or more conductors or optical fibers that serve as a common connection for the components of the CMOS image processor 300 and the related image processing components. Control bus 380 may be controlled by an external control unit 390. The external control unit may be a processor or processors, a processor component or software capable of being executed by a processor, and/or the like and may be incorporated on chip with the sensor array 310, etc, or it may located off chip as an independent device.

In an embodiment of the present invention, color cross-talk correction may be performed as part of Bayer domain processing 340. In the embodiment, color cross talk correction may be performed on the digitally converted outputs of the pixels in the sensor array 310 at the Bayer domain, prior to demosaicing. The correction may be made dynamically according to essentially real-time calculations of color cross-talk correction factors.

Figure 4A:
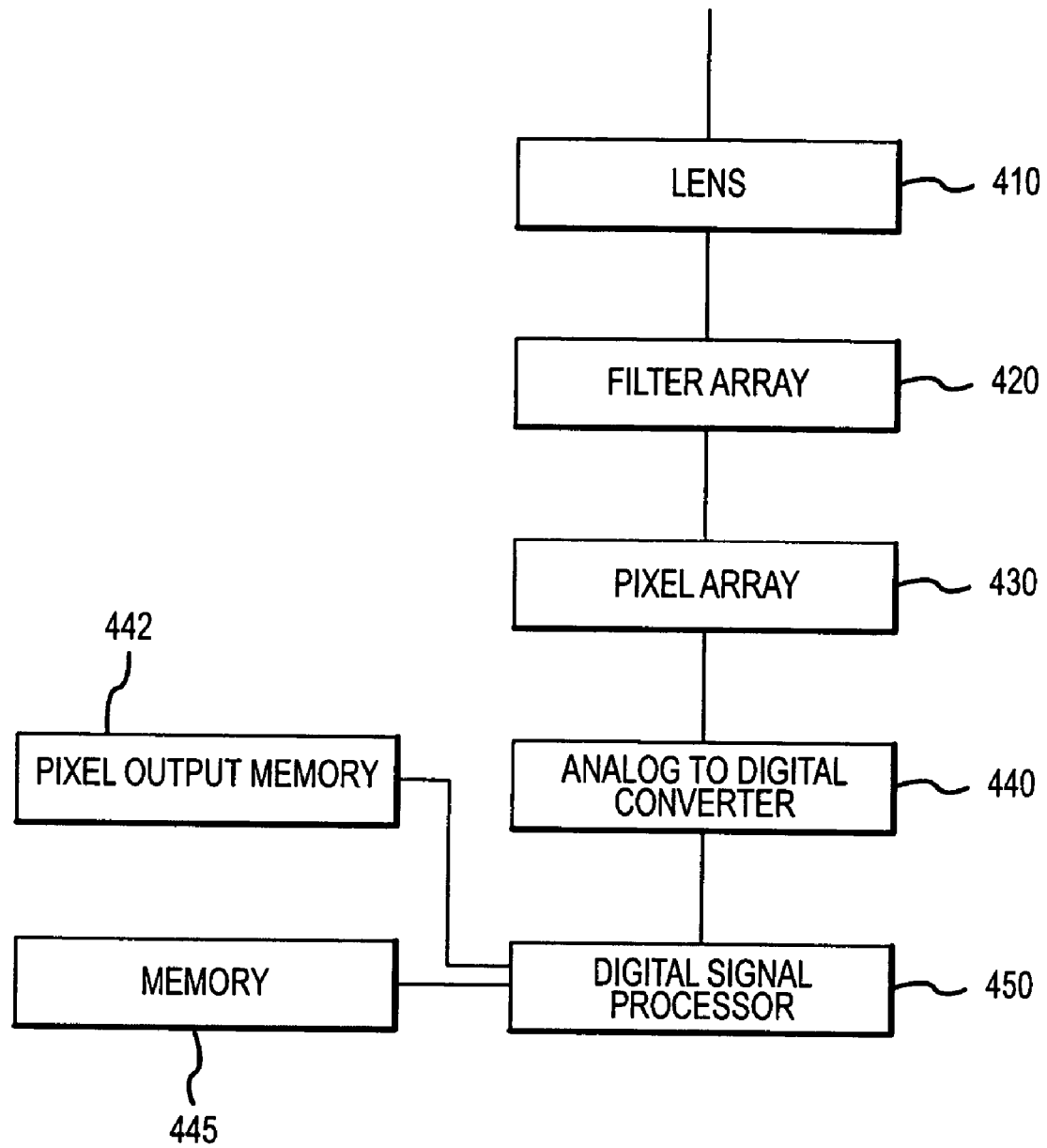
FIG. 4A is a simplified flow type diagram illustrating the use of a digital signal processor to correct for color cross-talk and/or green disparity in accordance with an embodiment of the present invention.

FIG. 4A is a simplified flow type diagram illustrating the use of a digital signal processor to correct for color cross-talk and/or green disparity in accordance with an embodiment of the present invention. In the process illustrated in FIG. 4A light from an object to be imaged may pass through a lens 410 and be focused by the lens onto an image sensor. In the image sensor the focused light may pass through a filter array 420. The filter array 420 may be comprised of filters of several different colors. In certain embodiments the filter array is arranged in a Bayer pattern In turn, the light passing through the pixel array 420 may be incident upon a pixel array 430. In certain aspects the pixel array 430 and the filter array 420 may be arranged to provide that each pixel in the pixel array 430 is associated with a one of the color filters in the filter array 420. The pixels on the pixel array 430 may produce analog voltage outputs in response to the incident illumination and these outputs may be converted by an analog to digital converter 440 to a digital form.

In certain aspects, the outputs from the analog to digital converter 440 may be applied to a digital signal processor 450 that may provide for correction of the color cross-talk associated with the digital outputs. In certain embodiments, the digital signal processor 450 may be associated with a memory 445 on which the constants C1, C2, C3, C4, C5, C6, C7, C8 and or the like may be stored. In operation, the pixel array 430 is generally scanned in a logical manner, i.e., the pixels are scanned in lines. As such, an output from a specific pixel to be color cross-talk and or green disparity corrected may be scanned and provided to the he digital signal processor 450 for correcting. However, as persons of skill in the art may appreciate, embodiments of the present invention use pixel environment, outputs from neighboring pixels, in the correction process. Consequently, the output of the pixel to be corrected may be scanned before one or more of the outputs from the neighboring pixels is scanned. As such, a pixel output memory may be used to store pixel outputs until the output from the pixel to be corrected and the outputs from the neighboring pixels have all been scanned on the pixel array and the digital signal processor 450 may then retrieve all of these outputs from the pixel output memory 442.

Having retrieved all of the necessary pixel outputs from the pixel to be corrected and the neighboring pixels, the digital signal processor 450 may retrieve correct constants for the pixel at issue from a memory 445. In some embodiments, the pixel output memory 442 and the memory 445 may be a single storage device. The correct constants for the pixel to be corrected may depend upon the pixel's color, i.e., the color of the filter associated with the pixel, and the type of line it is on, i.e. the color of the pixels horizontally appurtenant to the specific pixel. The digital signal processor 450 may correct for color cross-talk and or green disparity by calculating a color cross-talk or green disparity correction factor using a correction function that is dependent on the color of the pixel to be corrected, the environment of the pixel to be corrected, i.e., the outputs from the pixels neighboring the pixel, and the Cartesian location of the pixel to be corrected relative to the center of the pixel array 430.

After calculating the cross-talk value the digital signal processor 450 may use this value to correct the specific pixel's output. In this way, the digital signal processor 450 may provide for accurate, dynamic image processing to provide for color cross-talk correction in the Bayer domain without the use of extensive look up tables. In these embodiments, the digital signal processor 450 may be an independent processor or a general processor that corrects for green disparity and/or color cross-talk along with other signal processing tasks, or it could be a special circuit built for the purpose of green disparity and/or color cross-talk correction only. The digital signal processor 450 may be on chip with the image sensor or may be off chip.

Figure 4B:
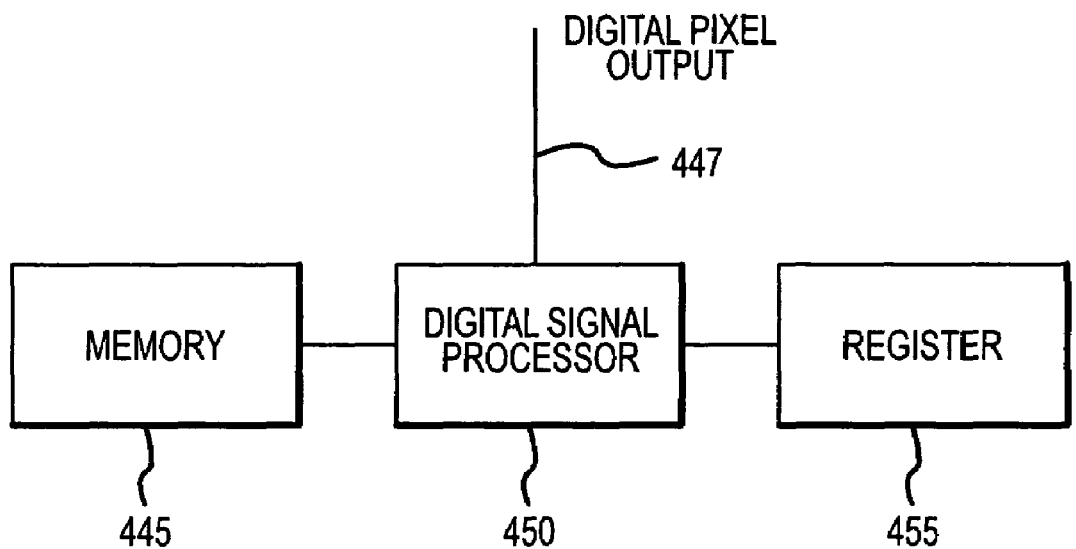
FIG. 4B illustrates a simplified flow type diagram of a digital signal processor and memory for color cross-talk and/or green disparity correction in accordance with an embodiment of the present invention.

FIG. 4B illustrates a simplified flow type diagram of a digital signal processor and memory for color cross-talk and/or green disparity correction in accordance with an embodiment of the present invention. In the illustrated embodiment, digitally converted pixels outputs 447 are retrieved from the pixel array and provided to the digital signal processor 445. The digital signal processor 445 may retrieve the applicable constants for a scanned pixel from memory 445 and process a color cross-talk and/or green disparity correction factor from the scanned pixels Cartesian location on the pixel array and the outputs of the pixels neighboring the scanned pixel.

When scanning of a new line of pixels commences, the digital signal processor 450 may calculate the Y Cartesian location component of the color cross-talk and/or green disparity equation, $(Y-Yc)^2$, for the first pixel scanned on the line and then may provide for the saving of the value of this Y Cartesian location component in a register 453. The register 453 may be a register, a memory device, a software program, a processor, and/or the like. In the illustrated embodiment, as the digital signal processor 450 calculates color cross-talk and/or green disparity correction factors for pixels on the same line the digital signal processor 450 may retrieve the value stored on the register 453.

Figure 4C:
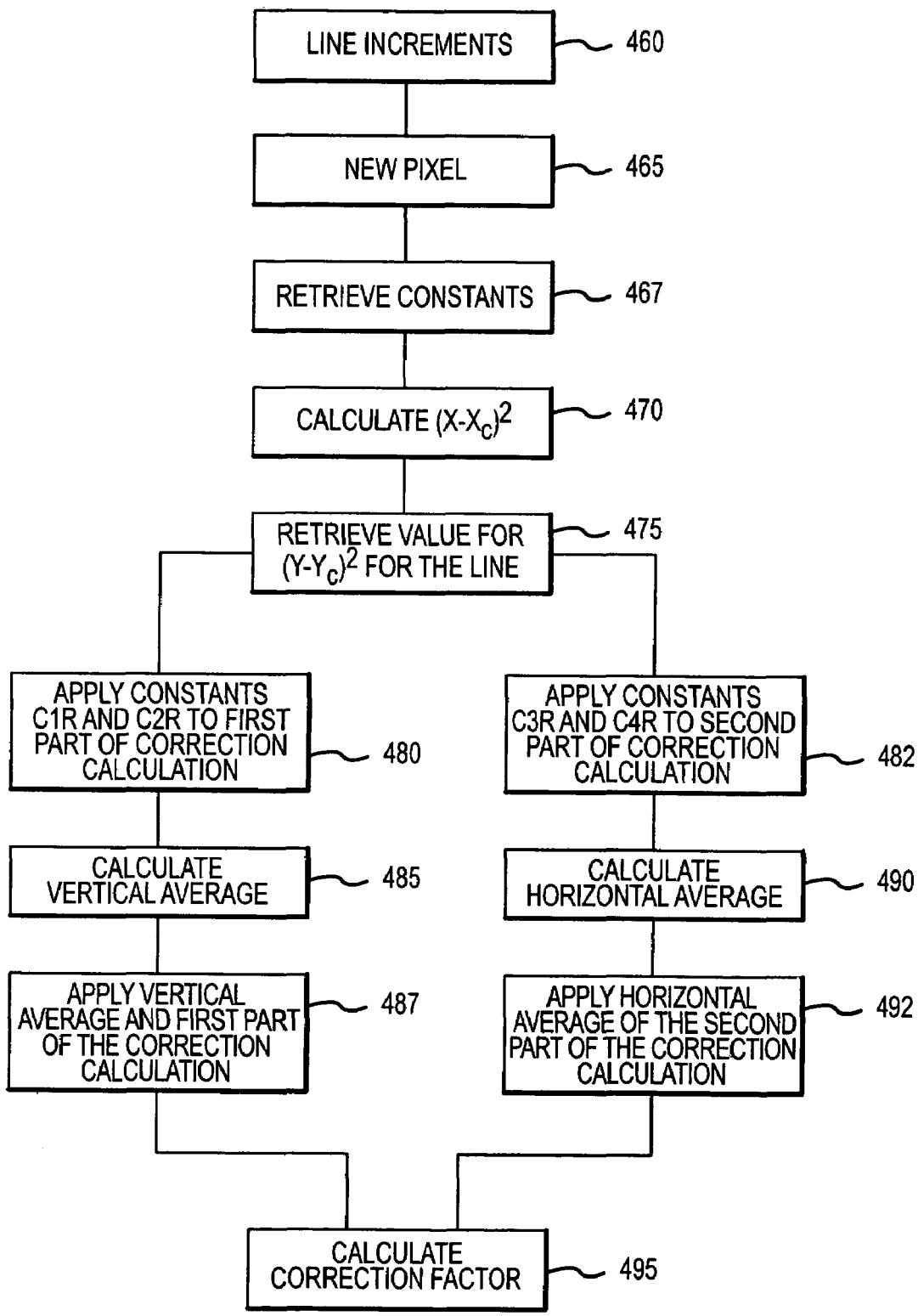
FIG. 4C illustrates a flow type diagram of a method for iteratively calculating green disparity correction factors in accordance with an embodiment of the current invention.

FIG. 4C illustrates a flow type diagram of a method for iteratively calculating green disparity correction factors in accordance with an embodiment of the current invention. In step 460, when a new line is being scanned on the pixel array a counter increments and $(Y-Yc)^2$ may be calculated and stored in a register, or the like. In step 465 a green pixel on the line is scanned and a digital output from the green pixel is received by the digital signal processor along with digital outputs from the pixels vertically and horizontally neighboring the green pixel. For the green pixel a first set of constants may be retrieved in step 467 from a memory device if the line of pixels being scanned is a red line. Alternatively, in step 467 a second set of constants may be retrieved from the memory device in step 467 if the line being scanned is blue.

In step 470 the value of $(X-Xc)^2$ according to the green pixels hyperbolic location may be evaluated and may be store in a register or other memory. In step 475 the $(Y-Yc)^2$ value, calculated in step 460 may be retrieved from the register and subtracted from the value of $(X-Xc)^2$, calculated in step 470, to get $((X-Xc)2-(Y-Yc)2)$ and the result of the operation may be stored in a register. In step 480 the value determined in step 475 may be multiplied by a constant C2r, where C2r is a constant for evaluating green disparity for a green pixel on a red line and was one of the constants retrieved in step 467. In step 480 the sum of C2r and $(X-Xc)2-(Y-Yc)2$ may be added to C1r, wherein C1r is a second constant associated with the green pixel located on the red line. If the green pixel is located on a blue line constant C1b and C2b may be used in step 480. In step 482 the value determined in step 475 may be multiplied by a constant C4r, where C4r is a constant for evaluating green disparity for a green pixel on a red line and was one of the constants retrieved in step 467. In step 482 the sum of C4r and $(X-Xc)2-(Y-Yc)2$ may be added to C3r, wherein C3r is a second constant associated with the green pixel located on the red line. If the green pixel is located on a blue line constant C3b and C4b may be used in step 482.

In step 485 the outputs of pixels vertically neighboring the green pixel may be averaged to calculate a value of Vm. In step 487 the value Vm may be multiplied by the value determined in step 480. In step 490 the outputs of pixels horizontally neighboring the green pixel may be averaged to calculate a value of Hm. In step 492 the value Hm may be multiplied by the value determined in step 482. In step 495 the output of the green pixel may be added to the negative of the result of step 487 and to the result of step 492 to obtain the color disparity corrected value for the green pixel.

Equation 3 may be rearranged as follows:

$$G'=G+Vm*(C1+C2*U)+Hm*(C3+C4*U) \qquad (4)$$

Where U is defined as:

$$U(x,y)=(x-Xc)^2-(y-Yc)^2 \qquad (5)$$

G, C1, C2, C3 and C4 may be two element vectors as before; however, for the sake of simpler notation, line subscripts are omitted.

In equation (5) when the scanned line changes from line y to line y+1, U may change as follows:

$$U(x,y+1)=U(x,y)+2*(Y-Yc)+1 \qquad (6)$$

Also, when the scanned input of pixels on the pixel array moves from a green pixel x to the next green pixel x+2, U may change as follows:

$$U(x+2,y)=U(x,y)+4*(X-Xc+1) \qquad (7)$$

In each of Equations 6 and 7 two registers or other memory type devices may be used and green disparity correction may be calculated form a subtraction, an increment and an addition operation as compared to a subtraction and a squaring for a horizontal and for a vertical step of Equation 5. This may provide for less complicated and/or a less processing circuit for processing green disparity and/or color cross-talk correction.

Equations 6 and 7 to may be rearranged to read:

$$U(x,y+1)=U(x,y)+S(y) \qquad (8)$$

$$U(x+2,y)=U(x,y)+T(x) \qquad (9)$$

As such, S and T may be calculated in accordance with embodiments of the present invention iteratively based on the equations:

$$S(y)=S(y-1)+2 \qquad (10)$$

$$T(x)=T(x-2)+4 \qquad (11)$$

In certain embodiments, two or more registers may be used to calculate the color-cross talk and/or green disparity wherein the iterative calculation may be one increment and one addition operation for each vertical and horizontal scanning step across the image sensor. In such embodiments, the S and the T of equation (10) and equation (11) are the same for the red and the blue lines.

Figure 5:
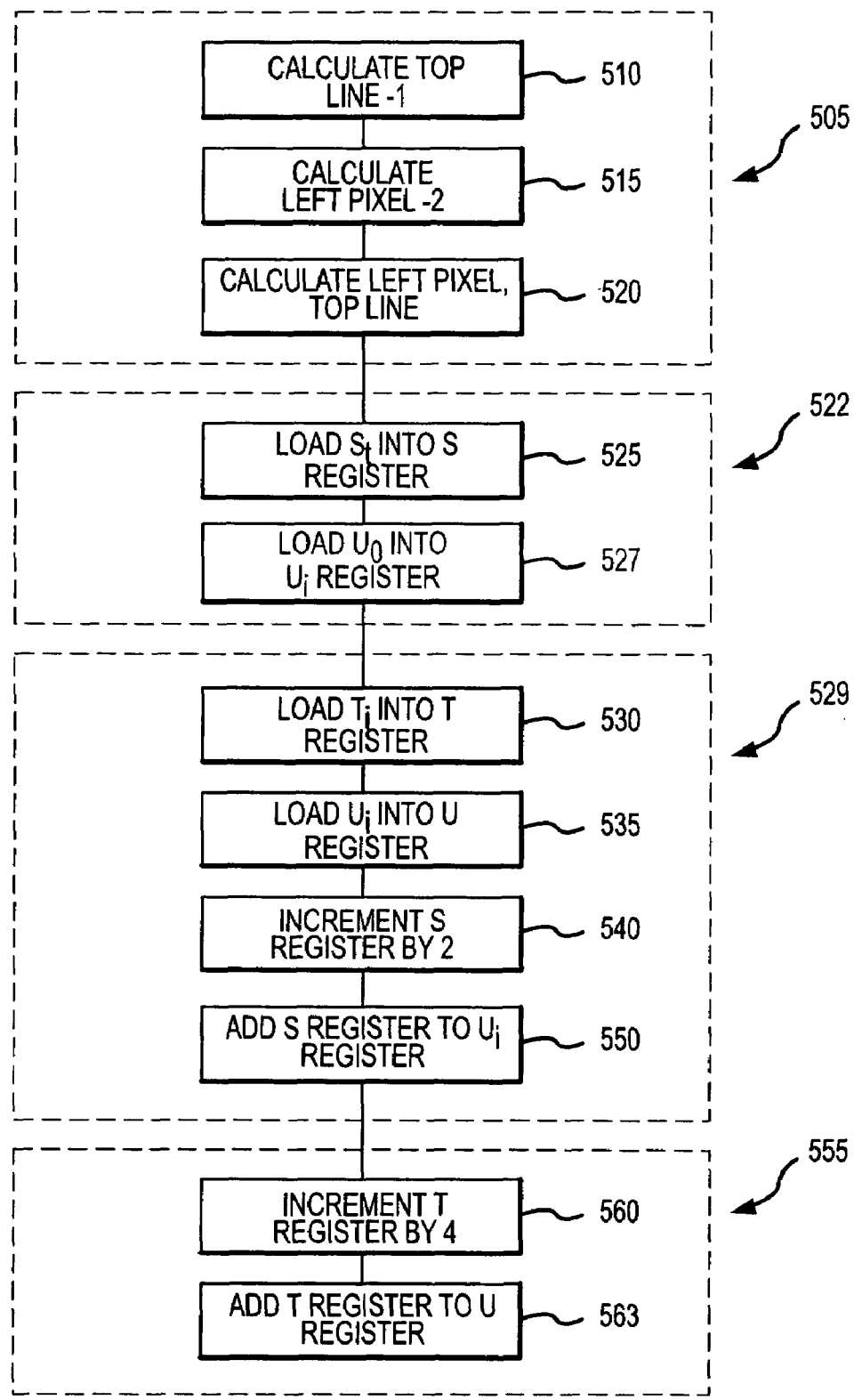
FIG. 5 illustrates a flow-type diagram of a further method for iteratively calculating a correction factor for color cross-talk and/or green disparity in accordance with an embodiment of the present invention.

FIG. 5 illustrates a flow-type diagram of a further method for iteratively calculating a correction factor for color cross-talk and/or green disparity in accordance with an embodiment of the present invention. In step 510 a value of S corresponding to a location top_line-1 on the pixel array may be calculated and stored in a St register. In step 515 a value for T corresponding to a location (left_pixel-2) on the pixel may be calculated and stored in a T1 register. In step 520 a U value for a pixel array location (left_pixel, top_line) may be determined and stored in a Uo register.

When scanning of a new frame starts 522, in step 525 a value for St may be loaded into a S register. At the beginning of the scan of the line on the pixel array, a value of U0 may be loaded into a Ui register 527. When scanning of a new line starts 529 in the new frame, in step 530 a value of T1 may be loaded into a T register 530 and a value of Ui may be loaded into a U register 535. In step 540, the S register may be incremented by 2. In step 550 the value of the S register may be added to the Ui register. Then for each new pixel scanned 555, in step 560 the T register may be incremented by 4 and the value of the T register may be summed with the value of the U register 563 to provide a color cross talk correction factor.

Figure 6:
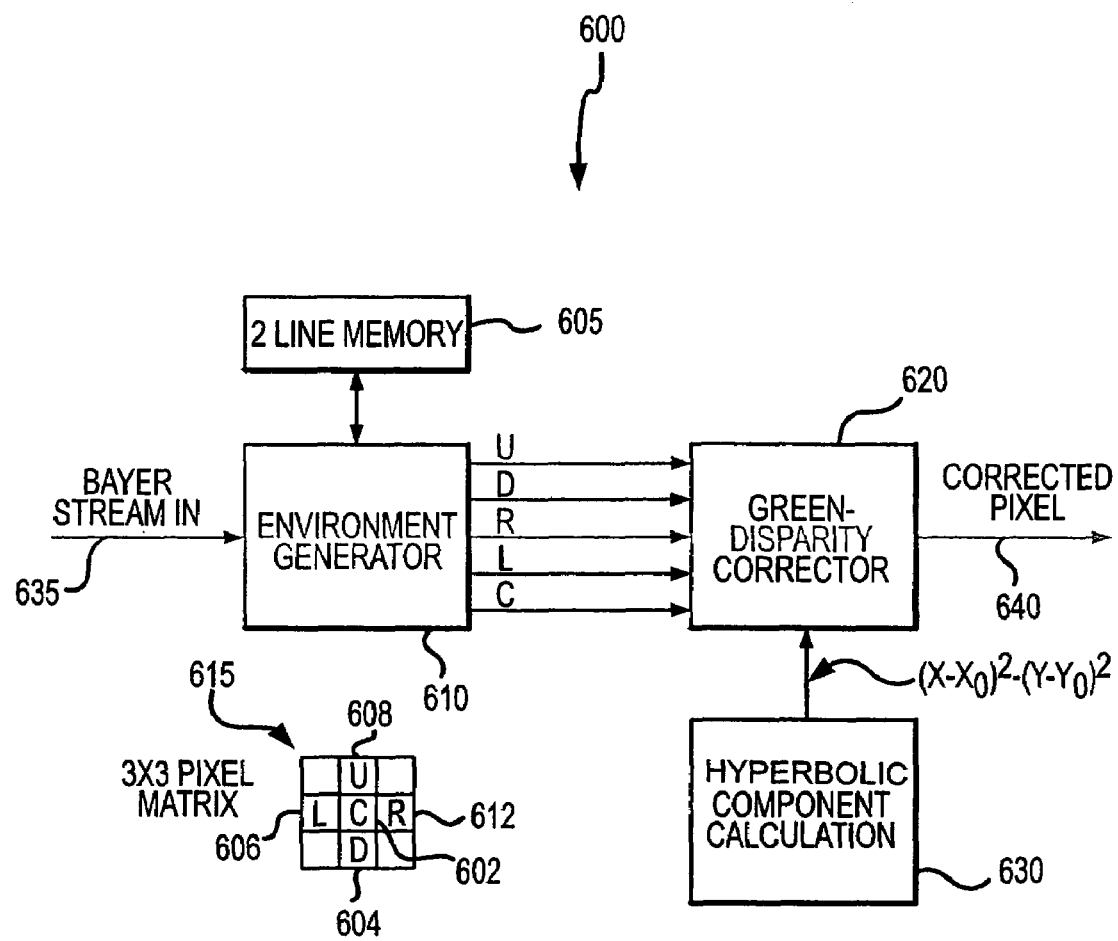
FIG. 6 illustrates a block diagram of components in a system for iteratively calculating a correction factor for color cross-talk and/or green disparity in accordance with an embodiment of the present invention.

FIG. 6 illustrates a block diagram of components in a system for iteratively calculating a correction factor for color cross-talk and/or green disparity in accordance with an embodiment of the present invention. The block diagram illustrates a green disparity correction circuit 600 that comprises three component circuits—an environment generator circuit 610 that may work in conjunction with a two line memory 605, a hyperbolic component calculator circuit 620, and a green disparity corrector circuit 630. Also illustrated in the block diagram is a three-by-three pixel matrix 615 that provides labels for pixel locations that may be used to identify pixels for purposes of the description of the green disparity correction in the green disparity correction circuit 600. In the three-by-three pixel matrix, a selected green pixel 602 is labeled C, an upper pixel 608 is labeled U, a down pixel 604 is labeled D, a left pixel 606 is labeled L and a right pixel 612 is labeled R.

In certain aspects, the environment generator 610 may determine and/or receive for the selected green pixel 602 (C) that is being corrected for green disparity the outputs from four neighboring pixels the upper pixel 608 (D) the right pixel 612 (R) and the left pixel 606 (L). In operation, the environment generator 610 may have to wait until the lower pixel 604 is scanned before it has all of the data necessary to provide for green disparity correction. As such, the output from the selected green pixel 602 may be stored in a memory, such as RAM, a processor, a register and/or the like, until an output from the lower pixel 604 is scanned when the output from the selected green pixel 602 may be retrieved and processing of a correction for green disparity commenced. As such, the green-disparity correction circuit 520 may introduce a delay in the video stream from the image sensor of at least one line. In the illustrated embodiment, the environment generator 610 may receive scanned pixel inputs 635 from the pixel array and may process the inputs to provide for the transfer of a synchronous output—comprising an output from the selected pixel 602 (C), an output from the upper pixel 608 (U), an output from the left pixel (605) (L), an output from the down pixel 604 (D) and an output of the right pixel 612 (R)—to the green disparity corrector 620. A memory device such as the two-line memory 605 may be used with the environment generator 610 to provide for the synchronous or substantially synchronous output from the environment generator 610.

The environment generator 610 may comprises some logic and delay elements and be in communication with and configured to operate with the two line memory 605. The hyperbolic component calculator 630 may comprise a processor, a circuit of logic gates, a software program, and/or the like that may identify pixel location on the pixel array relative to the center point and calculate hyperbolic location components for the pixel that may comprise $(X-X0)^2-(Y-Y0)^2$. In some embodiments, hyperbolic component calculator 630 may comprise a look up table for looking up hyperbolic components for the green disparity calculation. The green disparity corrector 620 may receive environment data from the environment generator 610 and hyperbolic component data from the hyperbolic component calculator 630 and process the data to correct the green disparity effect for the selected green pixel 602. The green disparity corrector 620 may be a processor, a software program, a circuit of logic gates, and/or the like.

Figure 7:
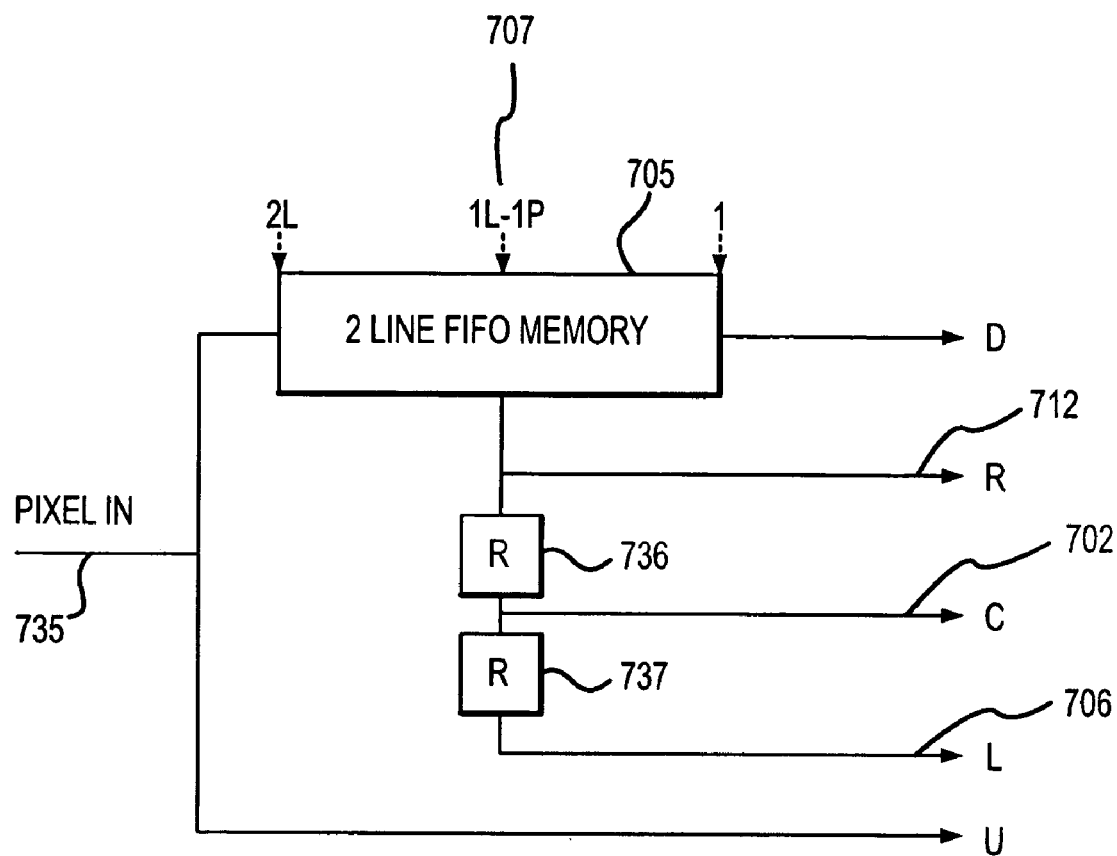
FIG. 7 depicts a simplified block diagram of an environment generator for a selected pixel in accordance with an embodiment of the current invention.

FIG. 7 depicts a simplified block diagram of an environment generator for a selected pixel in accordance with an embodiment of the current invention. In the depicted embodiment, incoming BAYER domain pixels comprise the U output from this sub-system—the incoming pixel is the one above the pixel to be green-disparity and/or color cross-talk corrected. In order to derive the selected green pixel 702, as well as the left pixel 706 and the right pixel 712 a tap in the FIFO memory may be used for reading out pixels at location (1L-1P) 707—where (1L-1P) 707 may define a pixel which was written one line minus one pixel after the down pixel 705 pixel, or the pixel to the right of the current pixel.

The selected green pixel 702 and the left pixel 706 pixel may also be read from the two line memory 705. However, reading from the two line memory 705 may be expensive in terms of power consumption. A device capable of creating a two pixel delay, such as a first register 736 and a second register 737, may be added to the illustrated embodiment to introduce a two pixel delay and may provide for providing the selected green pixel 702 output and the left pixel 706 output after the delay. The environment generator 710 may include, in addition to the two line memory 705, the register 736 and the register 737, a control unit (not shown) that may control reading and writing from the two line memory 705, the register 736 and the register 737.

Figure 8A:
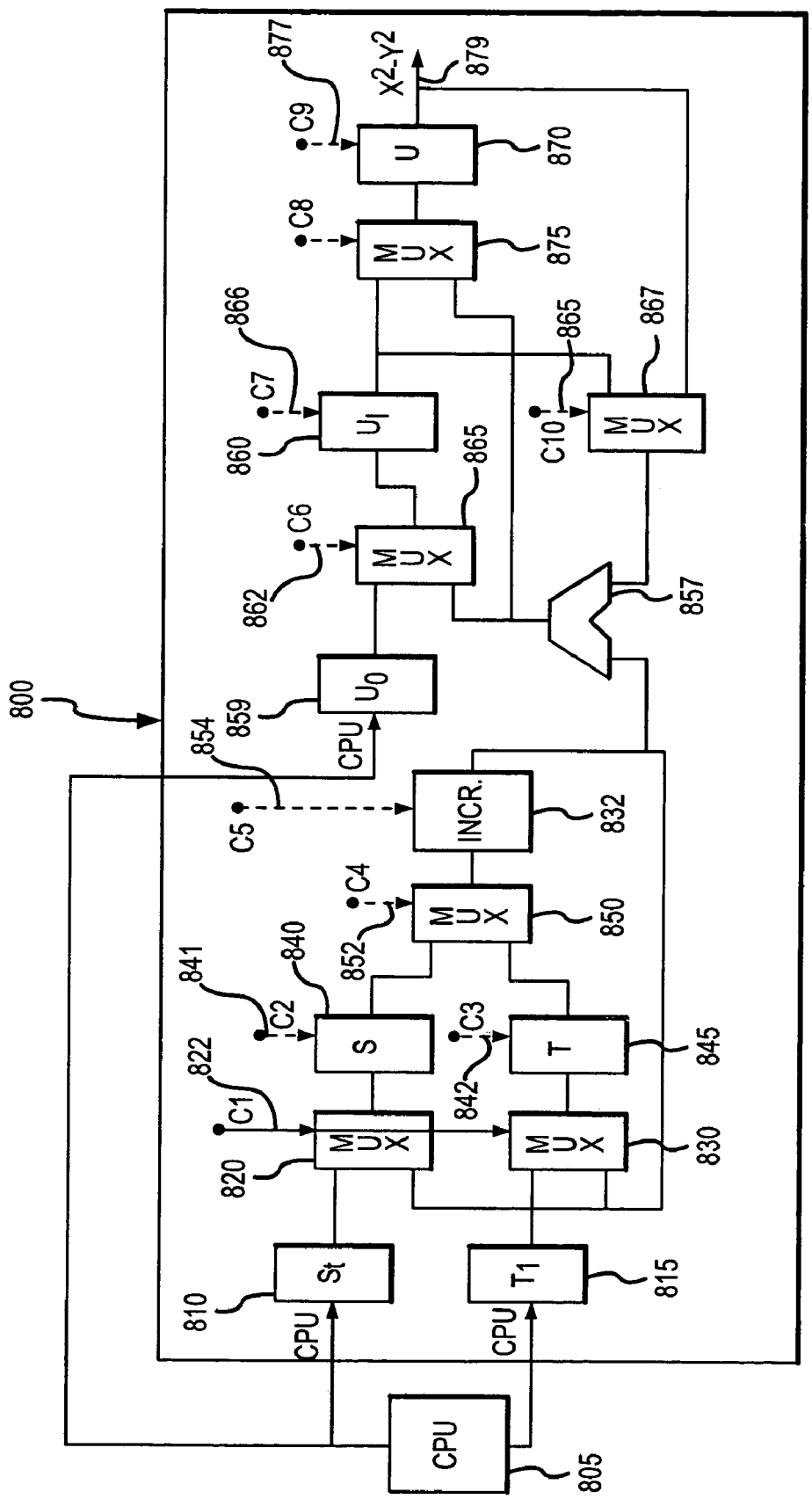
FIG. 8A depicts a circuit for calculating a hyperbolic component for a scanned pixel in accordance with an embodiment of the current invention.

FIG. 8A depicts a circuit for calculating a hyperbolic component for a scanned pixel in accordance with an embodiment of the current invention. In the illustrated embodiment, a hyperbolic component calculating circuit 800 is described for calculating a value of $X^2-Y^2$ 879 where a pixel array is being scanned according to a timing configuration of two clock cycles per scanned pixel. As persons of skill in the art may appreciate, different clock cycle timing configurations may be used and in these different timing configurations the layout and composition of the hyperbolic component calculating circuit 800 may change. Merely by way of example, a timing configuration of one clock cycle per pixel may be used but it would entail an increase in the number of components used in the hyperbolic component calculating circuit 800 since different components may be used at different times in the circuit and, thus, may perform two operations instead of having two components performing the different operations.

In the illustrated embodiment, a register 810 may be loaded with a value of St where St is the calculated value of S—as described in equation (10)—for a pixel location (top_line-1). The value of St may be ascertained by a central control unit 805 and provided by the central control unit 805 to the register 810. A register 815 may be loaded with a value of T1 by the central control unit 805 where T1 is the value of T as defined in equation (11) for pixel location (left_pixel-2). A multiplexer 820 may be controlled by a control signal C1 822 to select either an output St from the register 810 when the control signal C1 822b is high or an output from an incrementer 832 if the control signal C1 822 is low. A multiplexer 830 may be controlled by the control signal C1 822 to select either an output T1 from the register 811 when the control signal C1 822b is high or an output from the incrementer 832 if the control signal C1 822 is low. The input selected by the multiplexer 820 may be presented to a register 840. The input selected by the multiplexer 830 may be presented to a register 845. The input to the register 840 may be latched when a control signal C2 841 is high. The input to the register 845 may be latched when a control signal C3 842 is high.

In an embodiment of the present invention, a multiplexer 850 may select an output from the register 840 when a C4 control signal 852 is high. Alternatively, the multiplexer 850 may select an output from the register 845 when the control line C4 852 is low. In either event, the multiplexer 850 may present the selected output to the incrementer 832. A control signal C5 854 may be controlled by a control unit (not shown) that may provide for the incrementer 832 to increment an input provided to the incrementer 832 by the multiplexer 850 by two (2), four (4), or zero (0) depending upon relative location of the scanned green pixel on the pixel array. The incremented output from the incrementer 832 may be used to provide feedback to the multiplexer 822 and the multiplexer 830 and may also be provided to a left input of an adder 857.

In the illustrated embodiment, the central control unit 805 or another processor, software program, memory and/or the like, may determine a value of U, referred to as U0, as provided in Equation (5) for a new frame scan so that a new frame scan pixel location for calculating U0 may be (left_pixel, top_line) for the new frame scan and this calculated or stored value may be presented by the central control unit 805 to a register 859. At the beginning of each frame scan, a control signal C6 862 may be held at a high level to provide that a multiplexer 865 may present a value of U0 from the register 859 to a register 860.

In the illustrated embodiment, at the beginning of each line scan across the pixel array, the value held in register 840 may be incremented by the incrementer 832 and presented to a left input of the adder 857. At the beginning of each line scan across the pixel array, a control signal C10 865 may be held high and control a multiplexer 867 to select a previous value of Ui from the register 860 and provide the previous value of Ui to a right input of the adder 857. The adder 857 may then add the incremented value of S from the incrementer 832 to the previous value of Ui from the register 860. After the adder 857 has added the incremented value of S from the incrementer 832 to the previous value of Ui from the register 860, the control signal C6 862 may be held low to control the multiplexer 865 to route the output from the adder 857 to the register 860. A control signal C7 866 may go high when the output of the adder 857 is received by the register 860 to provide for the latching of the output by the register 860.

Additionally, in the illustrated embodiment, when the line is scanned on the pixel array, for every second pixel scanned on the line the control signal C1 may go low and control the register T 845 to provide the value held on the register T 845 to the incrementer 832. The control signal C5 854 may control the incrementer 832 to increment the value received from the register T 845 by four (4). When the value received from the register T 845 is received by the incrementer 832 and incremented by four (4), the multiplexer 830 may select the incremented value from the incrementer 832 and provide the incremented value to the T register 842 and the control signal C3 842 to control the T register 842 to latch the incremented output, and as a result, update the value of T stored in the T register 842

In parallel to the preceding, the control signal C10 may go low to control the multiplexer 867 to select a value retained in a register U 870 and to provide the value from the register U 870 to the right input of the adder 857. The left input of the adder 857 may be presented with the value of T incremented by 4—i.e., the next value of T, presented from the incrementer 832. The adder 857 may add the value of T incremented by 4 to the value from the register U 870. Subsequently, a control signal C8 may go low to control a multiplexer 875 to route the output of the adder 857 to the register U 870. A control signal C9 877 may go high to control the register U 870 to latch the received output from the adder 857 to provide for the updating of the register U 870. In this way, the circuit illustrated in FIG. 8A may provide for the iterative calculation of $X^2-Y2$ 879 that may provided to other circuits, processors, and/or image processing devices.

Figure 8B:
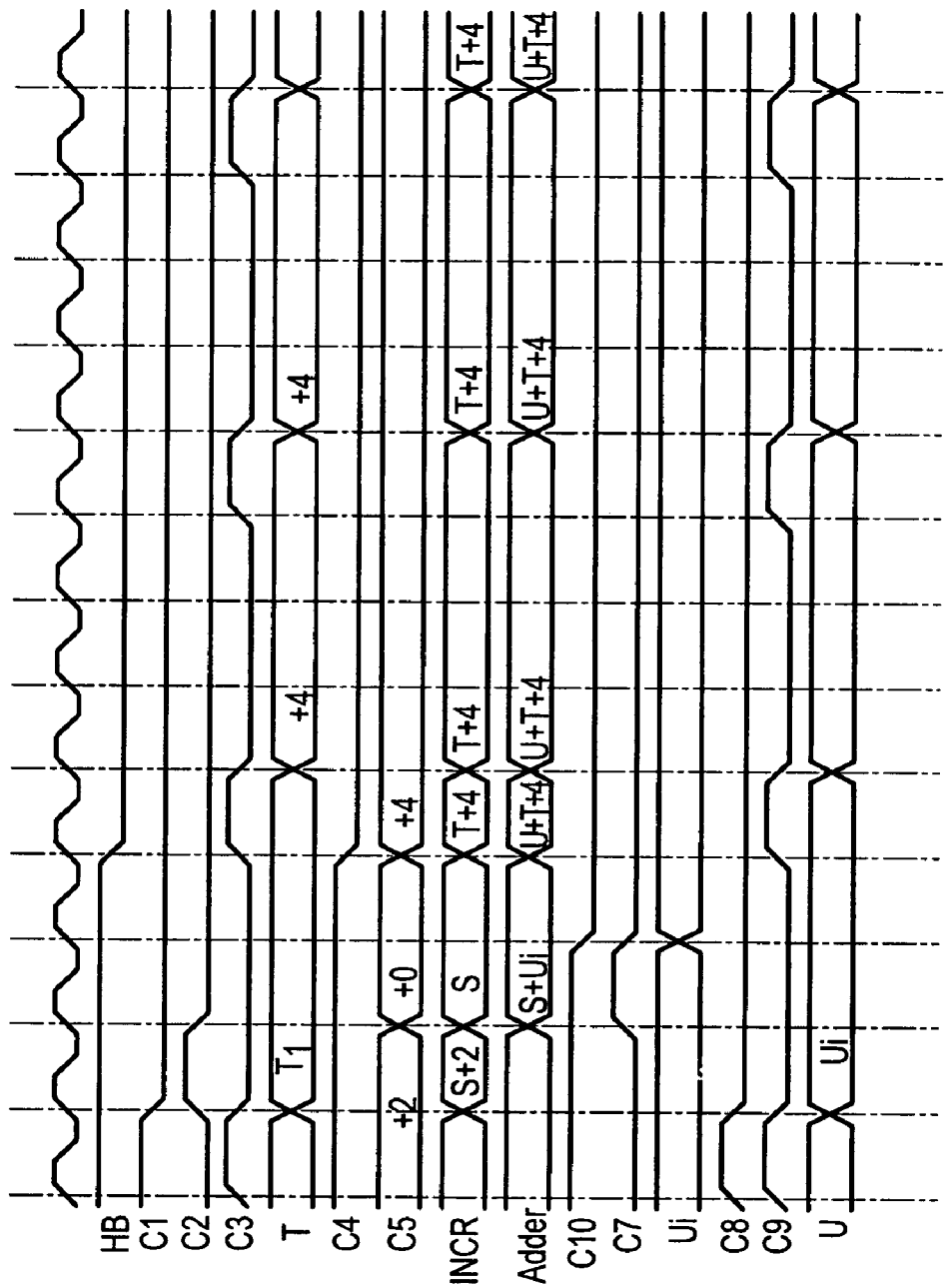
FIG. 8B illustrates timing waveforms for controlling the circuit described in FIG. 8A for scanning of a line change and a first few pixels of the newly scanned line in accordance with an embodiment of the current invention.

FIG. 8B illustrates timing waveforms for controlling the circuit described in FIG. 8A for scanning of a line change and a first few pixels of the new scanned line in accordance with an embodiment of the current invention.

FIG. 8C is a table providing numerical values of control signals, values of S and T and values of the components of the circuit illustrated in FIG. 8A for different pixel clock values as a pixel array is scanned in accordance with an embodiment of the current invention.

Figure 9:
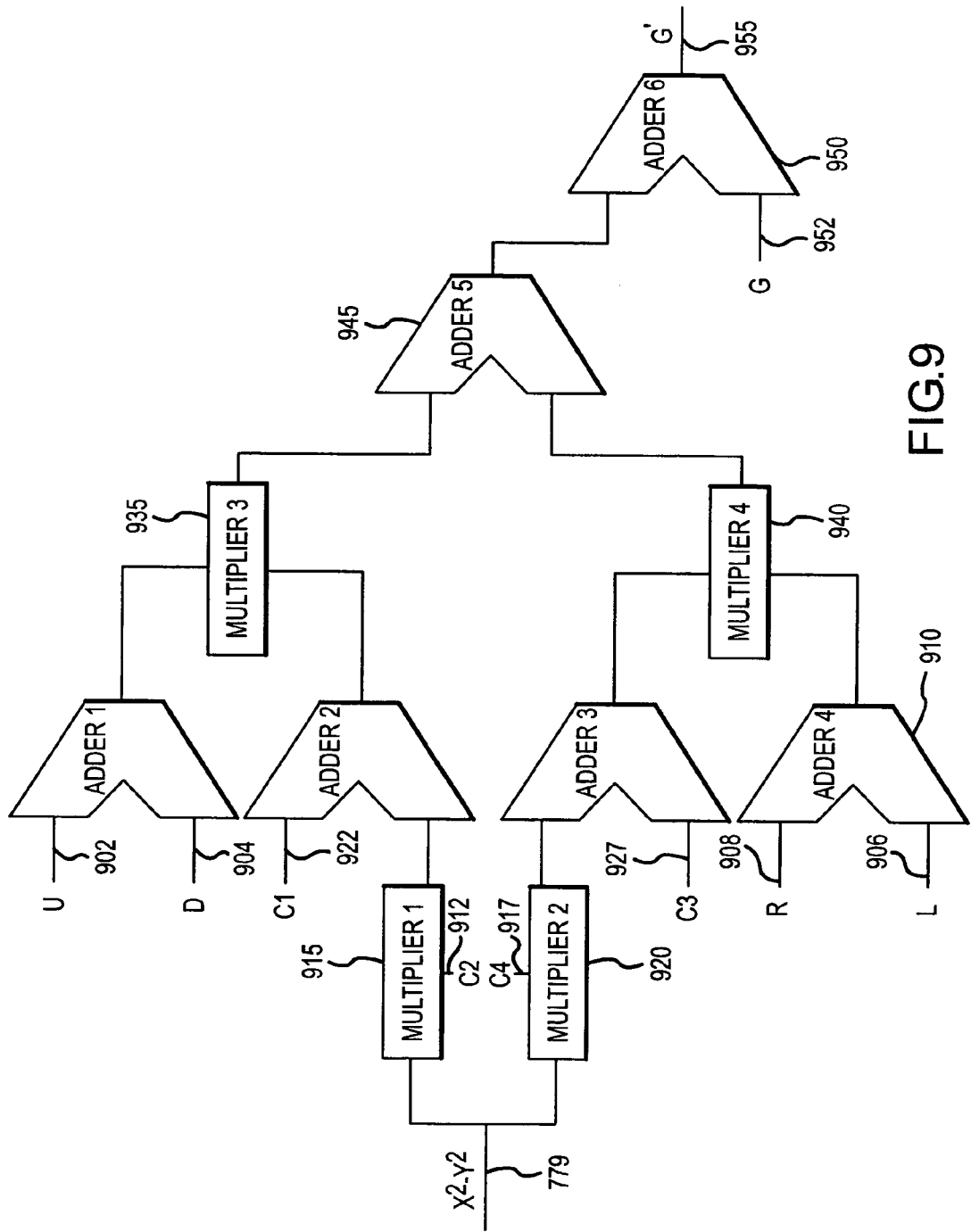
FIG. 9 illustrates a circuit for a green disparity corrector in accordance with an embodiment of the present invention.

FIG. 9 illustrates a circuit for a green disparity corrector in accordance with an embodiment of the present invention. The green disparity corrector circuit 900 may provide for implementing Equation 5, where Equation (5) provides the green disparity correction equation:

$$G'=G+Vm*(C1+C2*U)+Hm*(C3+C4*U) \quad (5)$$

In the illustrated embodiment, a value of $X^2-Y^2$ may be inputted to the circuit from a processor, a look up table, a software program, a calculation circuit (such as described in FIG. 8A) and/or the like. Values of a constant C1 922, a constant C2 912, a constant C3 927 and a constant C4 917 may be applied to the circuit from a processor, a look up table, a software program and/or the like. In the illustrated embodiment a value Vm describing an average of pixel outputs from pixels vertically neighboring the selected green pixel may be generated by an adder A1 905 that may sum an output from an upper pixel U 902 and an output from a down pixel D 904 and divides the result of the sum by two (2) to provide the value Vm. In the illustrated embodiment a value Vh describing an average of pixel outputs from pixels horizontally neighboring the selected green pixel may be generated by an adder A4 910 that may sum an output from a left pixel L 906 and an output from a right pixel R 908 and divides the result of the sum by two (2) to provide the value Vh.

In certain embodiments of the present invention, 2 clock cycles may be provided per pixel, and four clock cycles may be provided per every selected green pixel to be corrected. In such embodiments, the green disparity corrector circuit 800 may be implemented using at least two adders. In these embodiments, the arithmetic units may be fast enough to provide that at least a multiplication, an addition, several multiplex stages, and setup and delay of a register may all take place in one clock cycle. In such embodiments, the four clock cycles for the selected green pixel to be corrected may be represented by $\Phi 1$, $\Phi 2$, $\Phi 3$, $\Phi 4$. By time dividing the calculations to be performed in the illustrated embodiment, the number of arithmetic units and registers may be minimized. For example, a multiplier-1 915, an adder-5 945 and an adder-6 950 may be timed to operate at the clock cycle $\Phi 1$; the adder-1 905, an adder-2 925 and a multiplier-3 935 may timed to operate at the clock cycle $\Phi 2$; a multiplier-2 920 may timed to operate at clock cycle $\Phi 3$; and an adder-3, the adder-4 and a multiplier-4 940 may be timed to operate at the clock cycle $\Phi 4$. Using such a timing operation may provide that: the adder-1 905, the adder-3 930 and the adder-5 945 may be substituted by a single adder that may be supplied with different inputs for the different clock cycles. Similarly, the adder-2 925, the adder-4 910 and the adder-6 950 may be substituted by a single adder unit.

The multiplier-1 915, the multiplier-2 920, the multiplier-3 935 and the multiplier-4 940 may be substituted by a single multiplier (MLP) where a one clock delay register (not shown) may be used at the output of the single multiplier to provide for synchronization with the scanned outputs from pixels on different lines on the pixel array. Additionally, two additional registers (not shown) may be used at the output of the multiplier MLP to cause an extra two-clock-cycle delay in the path from the multiplier-2 920 to the adder-5 945. In certain aspects, the delay through the illustrated circuit may be more than 2 pixels, but, as it works in a pipelined manner, this delay may be mitigated. In certain aspects of the illustrated circuit, a delay to the adder-6 950 may be more than two pixels. As such, a selected green pixel output 952 provided to a lower input of the adder-6 950 may be delayed by two pixels. This delay of two pixels is equivalent to the right neighbor of the selected green pixel being delayed by one pixel.

Figure 10A:
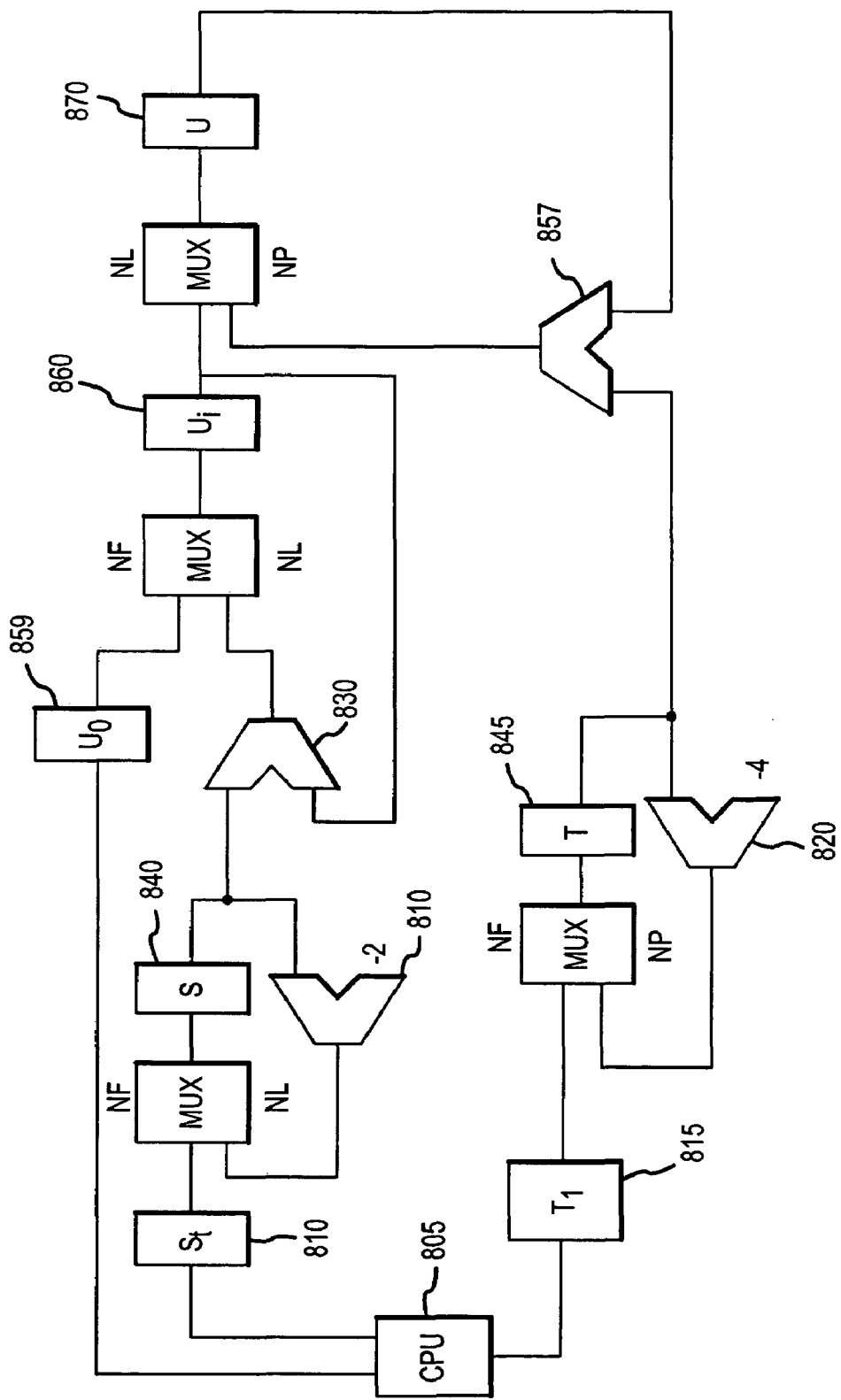
FIG. 10A illustrates a further circuit for a color cross-talk and/or a green disparity corrector in accordance with an embodiment of the present invention.

FIG. 10A illustrates a further circuit for a color cross-talk and/or a green disparity corrector in accordance with an embodiment of the present invention. FIG. 10A, illustrates how the circuit described in FIG. 8A may be configured in an image sensor device operating at one clock cycle per pixel in accordance with an embodiment of the present invention. The components have been provided with the same designations as were used in FIG. 8A where appropriate. In the illustrated embodiment, an incrementer 1010 may increment a value of S from the S register 740 by (2) when a new line (NL) is scanned. An incrementer 1020 may increment a value of T from the T register 745 by (4) when a new pixel (NP) is scanned. Further, an updated value of Ui may be added by an adder 1030 to an output from the S register 740 when a new pixel (NP) is scanned. As in the circuit shown in FIG. 8A, the CPU 705 may provide initial values to the St register 710, the T1 register 715 and the U0 register 759 when a new frame (NF) is scanned.

Figure 10B:
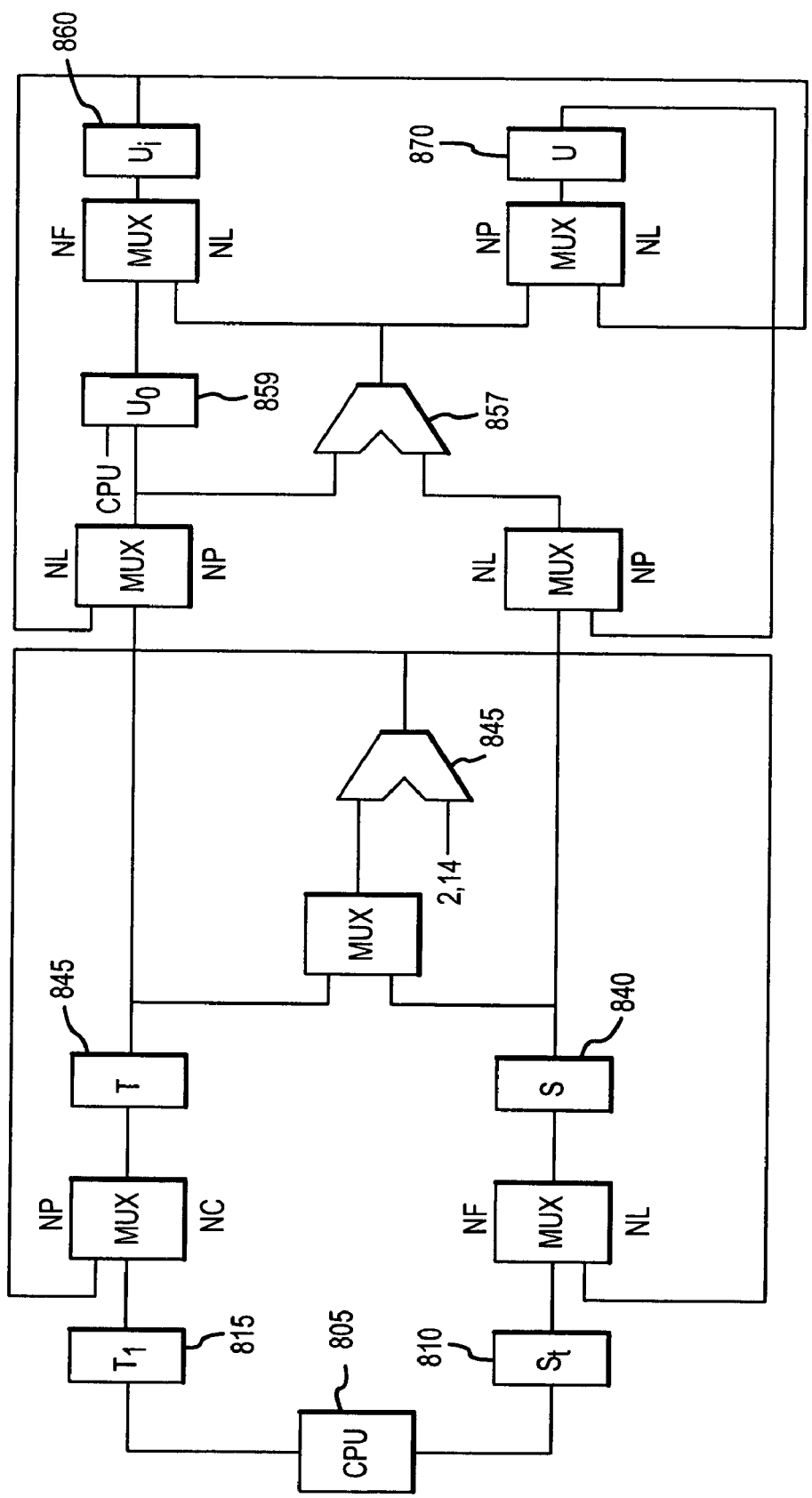
FIG. 10B illustrates a still further circuit for a color cross-talk and/or a green disparity corrector in accordance with an embodiment of the present invention.

FIG. 10B illustrates a still further circuit for a color cross-talk and/or a green disparity corrector in accordance with an embodiment of the present invention. The circuit illustrated in FIG. 10B is a reconfiguration of the circuit shown in FIG. 10A in which the two incrementers 1010 and 1020 are replaced by a single incrementer 1045. This replacement by the single incrementer 1045 is possible since incremention operations for new lines and new pixels do not occur contemporaneously.

The invention has now been described in detail for purposes of clarity of understanding. However, it would be appreciated that certain changes and modifications may be practiced within the scope of the appended claims.

What is claimed is:

1. An image processing system for dynamically correcting color cross-talk and/or green disparity in pixel outputs in an image sensor, comprising:

the image sensor, wherein the image sensor comprises at least a pixel array, an array of micro-lenses, and an array of color filters, and wherein:

the image sensor is optically coupled to a lens;

the array of color filters comprises at least a plurality of first color filters, a plurality of second color filters and a plurality of third color filters;

the plurality of first color filters, the plurality of second color filters and the plurality of third color filters are arranged in a mosaic pattern; and each pixel in the pixel array is associated with a one of the color filters;

means for receiving analog outputs from each pixel in the pixel array;

means for converting the received analog outputs to digital outputs;

means for retrieving a selected digital output from a selected pixel on the pixel array and neighboring digital outputs from pixels neighboring the selected pixel, wherein the neighboring pixels comprise a left pixel located horizontally appurtenant to and on the left hand side of the selected pixel, a right pixel located horizontally appurtenant to and on the right hand side of the selected pixel, an upper pixel located vertically appurtenant to and directly above the selected pixel, and a down pixel located vertically appurtenant to and directly below the selected pixel;

means for calculating a first digital average of the digital outputs from the left pixel and the right pixel;

means for calculating a second digital average of the digital outputs from the upper pixel and the down pixel;

means for processing a hyperbolic location for the scanned pixel, wherein the hyperbolic location is determined relative to a reference location on the pixel array;

means for determining a color cross-talk correction factor for the selected pixel, wherein:

the means for determining determines the color cross-talk correction factor from a correction function; and the correction function is a function of the hyperbolic location and the first and the second digital averages; and means for correcting the selected digital output with the correction factor.

2. The image processing system for dynamically correcting color cross-talk and/or green disparity in pixel outputs in the image sensor as recited in claim 1, wherein the image sensor is a CMOS image sensor.

3. The image processing system for dynamically correcting color cross-talk and/or green disparity in pixel outputs in the image sensor as recited in claim 1, wherein the reference location is an optical center of the pixel array.

4. The image processing system for dynamically correcting color cross-talk and/or green disparity in pixel outputs in the image sensor as recited in claim 3, wherein the optical center of the pixel array is ascertained by using a light source to uniformly illuminate the image sensor.

5. The image processing system for dynamically correcting color cross-talk and/or green disparity in pixel outputs in the image sensor as recited in claim 1, wherein the reference location is a physical center of the pixel array.

6. The image processing system for dynamically correcting color cross-talk and/or green disparity in pixel outputs in the image sensor as recited in claim 1, further comprising:
  means for storing the reference location; and
  means for retrieving the reference location from the means for storing, wherein the retrieved reference location is used by the processing means to process the hyperbolic location of the scanned pixel.

7. The image processing system for dynamically correcting color cross-talk and/or green disparity in pixel outputs in the image sensor as recited in claim 1, wherein:
  the plurality of the first color filters comprises a plurality of red filters;
  the plurality of the second color filters comprises a plurality of green filters;
  the plurality of the third color filters comprises a plurality of blue filters; and
  the mosaic pattern comprises a Bayer pattern.

8. The image processing system for dynamically correcting color cross-talk and/or green disparity in pixel outputs in the image sensor as recited in claim 1, wherein:
  the hyperbolic location is described in two-dimensional Cartesian coordinates comprising an x-coordinate measured on an x-axis from the reference location and a y-coordinate measured on a y-axis from the reference location;
  the correction function comprises a function of a square of the y-coordinate subtracted from a square of the x-coordinate.

9. A system for digitally correcting color cross-talk and/or green disparity at a Bayer domain in an image sensor using pixel location and pixel environment; comprising:
  a lens
  a CMOS image sensor optically coupled to the lens, wherein the CMOS image sensor comprises at least:
    an array of color filters positioned underneath the lens, wherein the array of color filters comprises a plurality of red filters, a plurality of blue filters and a plurality of green filters arranged in a Bayer pattern;
    a pixel array comprising a plurality of pixels positioned beneath the color lenses and configured to receive light that passes through the lens and the array of color filters; and
    each pixel in the plurality of pixels is associated with one of the color filters;
  a control unit in communication with the pixel array and configured to retrieve analog outputs from each pixel in the pixel array;
  an analog to digital converter in communication with the control unit and configured to receive the analog outputs and to convert the analog outputs to digital outputs;
  a first memory in communication with the analog to digital converter, wherein, the first memory is configured to store a digital output from a selected pixel on the pixel array and neighboring digital outputs from pixels neighboring the selected green pixel, wherein the neighboring pixels comprise a left pixel located horizontally appurtenant to and on the left hand side of the selected pixel, a right pixel located horizontally appurtenant to and on the right hand side of the selected pixel, an upper pixel located vertically appurtenant to and directly above the selected pixel, and a down pixel located vertically appurtenant to and directly below the selected pixel;
  a second memory configured to store a set of color cross-talk correction constants;
  a processor in communication with the first and second memory and configured to process a color cross-talk correction factor for the selected pixel, wherein:
    the processor determines a vertical average by averaging the digital outputs from the upper pixel and the down pixel;
    the processor determines a horizontal average by averaging the digital outputs from the left pixel and the right pixel;
    the processor processes a relative hyperbolic location of the selected pixel on the pixel array relative to a reference point on the pixel array; and
    the processor processes the color cross-talk correction factor from a color cross-talk correction function using the relative hyperbolic location, the vertical average, the horizontal average and the set of color cross-talk correction constants.

10. The system for digitally correcting color cross-talk and/or green disparity at a Bayer domain in an image sensor using hyperbolic pixel location as recited in claim 9, wherein the reference point is an optical center of the pixel array.

11. The system for digitally correcting color cross-talk and/or green disparity at the Bayer domain in the image sensor using pixel location and pixel environment; as recited in claim 9, wherein the reference point is a physical center of the pixel array.

12. The system for digitally correcting color cross-talk and/or green disparity at the Bayer domain in the image sensor using pixel location and pixel environment; as recited in claim 9, wherein:
  the selected pixel is a pixel associated with a green filter situated on a red line; and
  the set of color cross-talk correction constants comprise constants for use in the color cross-talk correction function for any green filter on any red line in the image sensor.

13. The system for digitally correcting color cross-talk and/or green disparity at the Bayer domain in the image sensor using pixel location and pixel environment; as recited in claim 9, wherein the first and the second memory comprise a single storage device.

14. The system for digitally correcting color cross-talk and/or green disparity at the Bayer domain in the image sensor using pixel location and pixel environment; as recited in claim 9, wherein:
  the relative hyperbolic location is described in two-dimensional Cartesian coordinates, wherein the Cartesian coordinates comprise an x-coordinate measured on an x-axis from the reference point and a y-coordinate measured on a y-axis from the reference point;

the correction function comprises a function of a square of the y-coordinate subtracted from a square of the x-coordinate multiplied by a first constant and then added to a second constant and multiplied by the first digital average summed with the square of the y-coordinate subtracted from the square of the x-coordinate multiplied by a third constant and added to a fourth constant and multiplied by the second digital average; and the set of color cross-talk correction constants comprises the first constant, the second constant, the third constant, and the fourth constant.

15. The system for digitally correcting color cross-talk and/or green disparity at the Bayer domain in the image sensor using pixel location and pixel environment; as recited in claim 9, further comprising a third memory in communication with the processor, wherein:

the third memory is configured to store at least one calculated value of a part of the correction function for an initial position on the pixel array;

the control unit retrieves the analog outputs from the pixels in the pixel array by scanning the pixel array starting at the initial position; and the processor is configured to retrieve the at least one calculated value from the third memory and to iteratively process the relative hyperbolic location for the selected pixel by incrementing the calculated value by an incremental value that is dependant upon a location of the selected pixel relative to the initial position.

16. The system for digitally correcting color cross-talk and/or green disparity at a Bayer domain in an image sensor using hyperbolic pixel location in claim 15, wherein:

the second memory comprises at least one register; and the processor comprises a combination of at least one multiplexer, at least one adder, and at least one multiplier.

17. A system for digitally correcting color cross-talk and/or green disparity at a Bayer domain in an image sensor using pixel location and pixel environment, comprising:

receiving illumination through a lens onto a CMOS image sensor, wherein said CMOS image sensor is optically coupled to said lens and comprises at least:

an array of color filters located underneath the lens, wherein the array of color filters comprises at least a plurality of first color filters, a plurality of second color filters and a plurality of third color filters and wherein the plurality of the first color filters, the plurality of the second color filters and the plurality of the third color filters are arranged in a mosaic pattern; and an array of photo-sensitive elements located underneath the array of colored filters and configured to receive light passing through the lens and the array of color filters, wherein the array of photo-sensitive elements comprises at least a plurality of first photo-sensitive elements each associated with each of said first color filters, a plurality of second photo-sensitive elements each associated with each of said second color filters and a plurality of third photo-sensitive elements each associated with each of said third color filters;

identifying a center point of the array of the photo-sensitive elements;

determining a first hyperbolic location for a selected photo-sensitive element relative to the center point;

receiving an output from the selected photo-sensitive element;

receiving outputs from photo-sensitive elements neighboring the selected photo-sensitive element, wherein the neighboring photo-sensitive elements comprise a left photo-sensitive element located horizontally appurtenant to and on the left hand side of the selected photo-sensitive element, a right photo-sensitive element located horizontally appurtenant to and on the right hand side of the selected photo-sensitive element, an upper photo-sensitive element located vertically appurtenant to and directly above the selected photo-sensitive element, and a down photo-sensitive element located vertically appurtenant to and directly below the selected photo-sensitive element;

calculating a vertical average by averaging the outputs from the upper photo-sensitive element and the down photo-sensitive element;

calculating a horizontal average by averaging the outputs from the right photo-sensitive element and the left photo-sensitive element;

retrieving a set of color cross-talk correction constants;

processing a color cross-talk correction factor for the selected photo-sensitive element using a color cross-talk correction function, wherein:

the color cross-talk correction factor is calculated by applying the first hyperbolic location, the horizontal average, the vertical average and the set of color cross-talk correction constants to the color cross-talk correction function; and color cross-talk correction function is a hyperbolically varying function; and using the processed color cross-talk correction factor to dynamically correct the output from the selected photo-sensitive element at the Bayer domain.

18. The system for digitally correcting color cross-talk and/or green disparity at the Bayer domain in the image sensor using pixel location and pixel environment; as recited in claim 17, further comprising:

converting the color cross-talk corrected output from the selected photo-sensitive element to a YUV signal.

19. The system for digitally correcting color cross-talk and/or green disparity at the Bayer domain in the image sensor using pixel location and pixel environment; as recited in claim 17, wherein:

the center point is an optical center of the array of photo-sensitive elements; and the optical center is determined from optical properties of the lens.

20. The system for digitally correcting color cross-talk and/or green disparity at the Bayer domain in the image sensor using pixel location and pixel environment; as recited in claim 19, wherein the optical center is determined by uniformly illuminating the CMOS image sensor to determine a location with a highest output.

21. The system for digitally correcting color cross-talk and/or green disparity at the Bayer domain in the image sensor using pixel location and pixel environment; as recited in claim 17, wherein the center point is a physical center of the of the photo-sensitive elements.

22. A method for digitally correcting color cross-talk and/or green disparity effects at a Bayer domain in a CMOS image sensor using hyperbolic pixel location, comprising:

providing a lens;

providing said CMOS image sensor, wherein said CMOS image sensor is optically coupled to said lens and comprises at least:

an array of color filters located underneath the lens, wherein the array of color filters comprises at least a plurality of first color filters, a plurality of second color filters and a plurality of third color filters and wherein the plurality of the first color filters, the plurality of the second color filters and the plurality of the third color filters are arranged in a mosaic pattern; and an array of photo-sensitive elements located underneath the array of colored filters and configured to receive light passing through the lens and the array of color filters, wherein the array of photo-sensitive elements comprises at least a plurality of first photo-sensitive elements each associated with each of said first color filters, a plurality of second photo-sensitive elements each associated with each of said second color filters and a plurality of third photo-sensitive elements each associated with each of said third color filters;

logically scanning outputs from each of the photo-sensitive elements in the photo-sensitive element array starting from an initial scanning point on the photo-sensitive element array;

calculating a hyperbolic equation value for the initial scanning point, wherein:
  the initial scanning point is described in Cartesian coordinates (XY) relative to a center of the photo-sensitive element array, (Xc, Yc);
  the hyperbolic equation value is determined from the equation $(X-Xc)^2-(Y-Yc)^2$ receiving an output from a selected photo-sensitive element;

receiving outputs from photo-sensitive elements neighboring the selected photo-sensitive element, wherein the neighboring photo-sensitive elements comprise a left photo-sensitive element located horizontally appurtenant to and on the left hand side of the selected photo-sensitive element, a right photo-sensitive element located horizontally appurtenant to and on the right hand side of the selected photo-sensitive element, an upper photo-sensitive element located vertically appurtenant to and directly above the selected photo-sensitive element, and a down photo-sensitive element located vertically appurtenant to and directly below the selected photo-sensitive element;

calculating a vertical average by averaging the outputs from the upper photo-sensitive element and the down photo-sensitive element;

calculating a horizontal average by averaging the outputs from the right photo-sensitive element and the left photo-sensitive element;

retrieving a set of correction constants;

iteratively calculating a hyperbolic location in Cartesian coordinates for the selected photo-sensitive element array, wherein the hyperbolic location for the selected photosensitive element is determined from the hyperbolic equation value for the initial scanning point incremented by an X-value and a Y-value that are each dependant upon a position of the selected photosensitive element relative to the initial scanning point processing a color cross-talk correction factor for the selected photo-sensitive element using a color cross-talk correction function, wherein:
  the color cross-talk correction factor is calculated by applying the hyperbolic location value, the horizontal average, the vertical average and the set of correction constants to the color cross-talk correction function; and
  color cross-talk correction is a hyperbolically varying function; and using the processed color cross-talk correction factor to dynamically correct the output from the selected photo-sensitive element at the Bayer domain.

* * * * *